(12) United States Patent
Numata et al.

(10) Patent No.: US 12,711,963 B2
(45) Date of Patent: Aug. 18, 2026

(54) POWER TOOL SYSTEM

(71) Applicant: MAKITA CORPORATION, Anjo (JP)

(72) Inventors: Fumitoshi Numata, Anjo (JP); Koichi Yakabe, Anjo (JP); Takumi Hayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 154 days.

(21) Appl. No.: 18/650,427

(22) Filed: Apr. 30, 2024

(65) Prior Publication Data

US 2024/0395260 A1 Nov. 28, 2024

(30) Foreign Application Priority Data

May 22, 2023 (JP) ................................ 2023-083927

(51) Int. Cl.

| | |
|---|---|
| ***G10L 19/00*** | (2013.01) |
| ***B25F 5/00*** | (2006.01) |
| ***G10L 17/06*** | (2013.01) |
| ***G10L 17/22*** | (2013.01) |
| ***H04R 1/10*** | (2006.01) |
| ***H04R 1/1025*** | (2026.01) |
| ***H05B 47/175*** | (2020.01) |

(52) U.S. Cl.

CPC ................ *G10L 17/22* (2013.01); *B25F 5/00* (2013.01); *G10L 17/06* (2013.01); *H04R 1/1008* (2013.01); *H04R 1/1025* (2013.01); *H04R 1/1041* (2013.01); *H05B 47/197* (2024.01); *H04R 2420/07* (2013.01)

(58) Field of Classification Search

CPC ........ H05B 47/197; H01H 9/06; G10L 17/00; G10L 17/06; G10L 17/22; G10L 2015/223; G10L 15/22; H04R 1/1025; H04R 1/1041; H04R 1/1008; H04R 5/033; H04R 2420/07; H04R 1/026; B25F 5/00

USPC .......................................................... 704/246

See application file for complete search history.

(56) References Cited

U.S. PATENT DOCUMENTS

| | | | | |
|---|---|---|---|---|
| 10,477,291 | B2 * | 11/2019 | Litovsky | H04R 1/026 |
| 2016/0035349 | A1 * | 2/2016 | Jung | G10L 15/22 704/235 |
| 2024/0347286 | A1 * | 10/2024 | Abbott | H01H 9/06 |

FOREIGN PATENT DOCUMENTS

| | | | | |
|---|---|---|---|---|
| JP | 2014124060 | A * | 7/2014 | |
| JP | 2018-108619 | A | 7/2018 | |
| JP | 2021066004 | A * | 4/2021 | |
| WO | WO-2017099354 | A1 * | 6/2017 | H04R 5/04 |

* cited by examiner

*Primary Examiner* — Md S Elahee

(74) *Attorney, Agent, or Firm* — Oliff PLC

(57) ABSTRACT

A power tool system includes at least one controlled device including a power tool, and a voice control device configured to wirelessly communicate with the at least one controlled device. The voice control device includes a at least one first processor configured to control operation of the at least one controlled device. The at least one first processor is configured to acquire voice data, and to control operation of the power tool in accordance with a command relating to the operation of the power tool and identified based on the voice data.

19 Claims, 17 Drawing Sheets

1
3
5, 50
7
51
52
53
55
56
58
501
502
516
31
33
34
35
37
38
311
313
314
315
316, 317
11
12
13
16
18
91
93
111
115
116, 117
118
141
100, 101
100, 102
100, 103

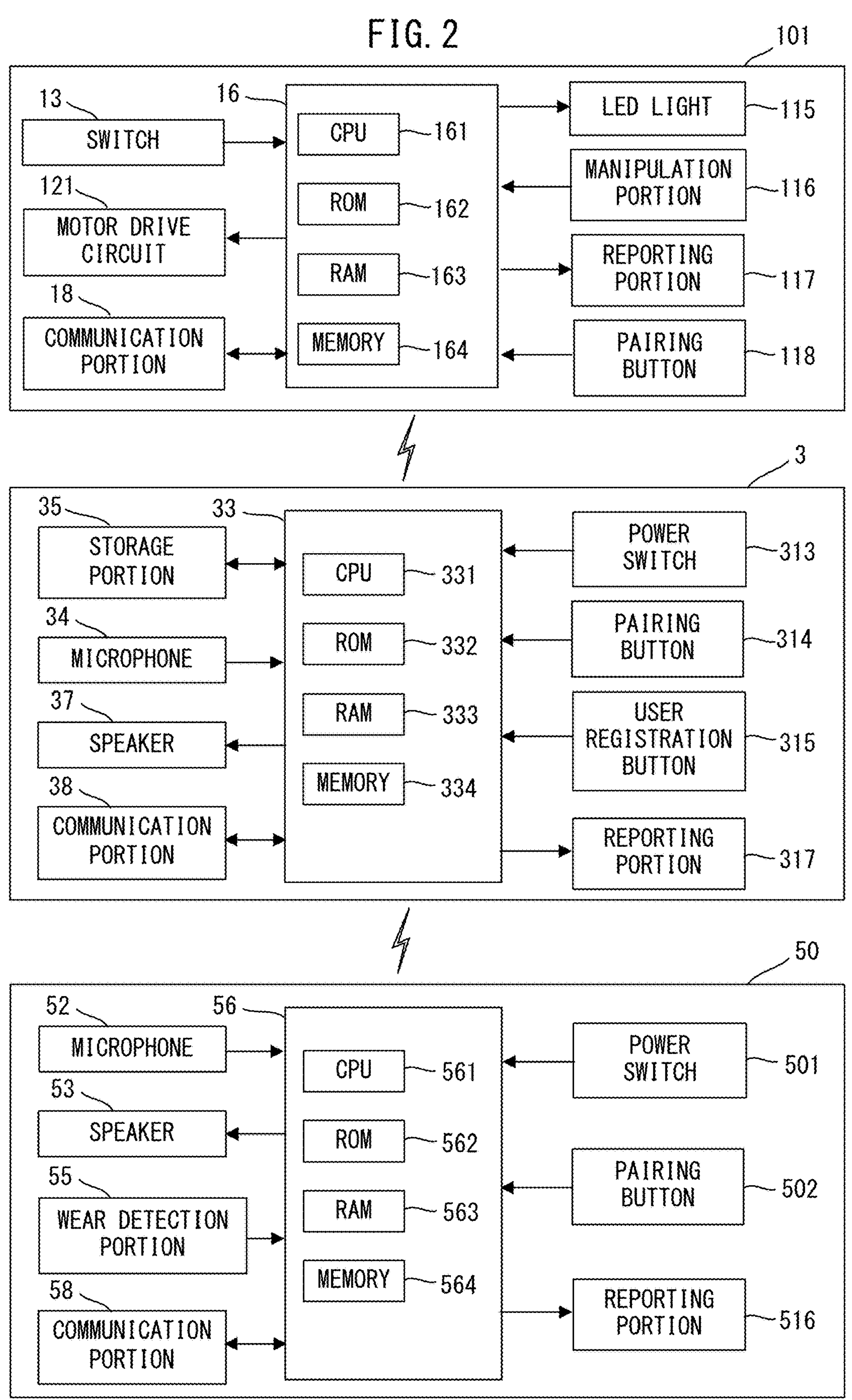
FIG. 2
101
13
SWITCH
16
CPU
161
ROM
162
RAM
163
MEMORY
164
121
MOTOR DRIVE CIRCUIT
18
COMMUNICATION PORTION
LED LIGHT
115
MANIPULATION PORTION
116
REPORTING PORTION
117
PAIRING BUTTON
118
3
35
STORAGE PORTION
33
CPU
331
ROM
332
RAM
333
MEMORY
334
34
MICROPHONE
37
SPEAKER
38
COMMUNICATION PORTION
POWER SWITCH
313
PAIRING BUTTON
314
USER REGISTRATION BUTTON
315
REPORTING PORTION
317
50
52
MICROPHONE
56
CPU
561
ROM
562
RAM
563
MEMORY
564
53
SPEAKER
55
WEAR DETECTION PORTION
58
COMMUNICATION PORTION
POWER SWITCH
501
PAIRING BUTTON
502
REPORTING PORTION
516

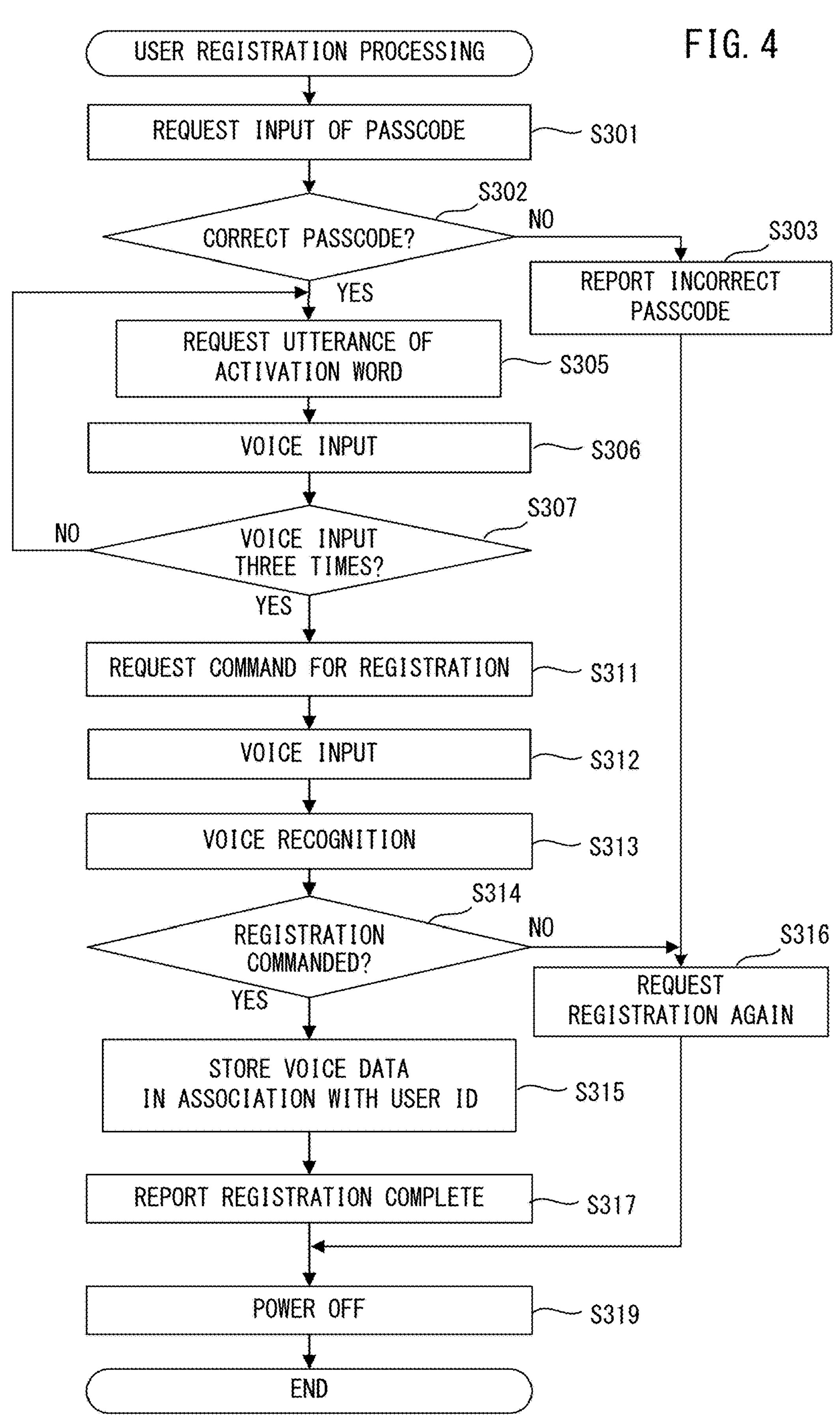
FIG. 4
USER REGISTRATION PROCESSING
REQUEST INPUT OF PASSCODE
S301
CORRECT PASSCODE?
S302
NO
YES
REPORT INCORRECT PASSCODE
S303
REQUEST UTTERANCE OF ACTIVATION WORD
S305
VOICE INPUT
S306
VOICE INPUT THREE TIMES?
S307
NO
YES
REQUEST COMMAND FOR REGISTRATION
S311
VOICE INPUT
S312
VOICE RECOGNITION
S313
REGISTRATION COMMANDED?
S314
NO
YES
REQUEST REGISTRATION AGAIN
S316
STORE VOICE DATA IN ASSOCIATION WITH USER ID
S315
REPORT REGISTRATION COMPLETE
S317
POWER OFF
S319
END MAIN PROCESSING
S400
PAIRING BUTTON PRESSED?
NO
YES
PAIRING PROCESSING
S410
USER AUTHENTICATION PROCESSING
S450
COMMAND IDENTIFICATION PROCESSING
S470
COMMAND EXECUTION PROCESSING
S500
S551
PAIRING BUTTON PRESSED?
YES
NO
S552
VOICE DATA AND DETECTION CODE ACQUIRED?
NO
YES

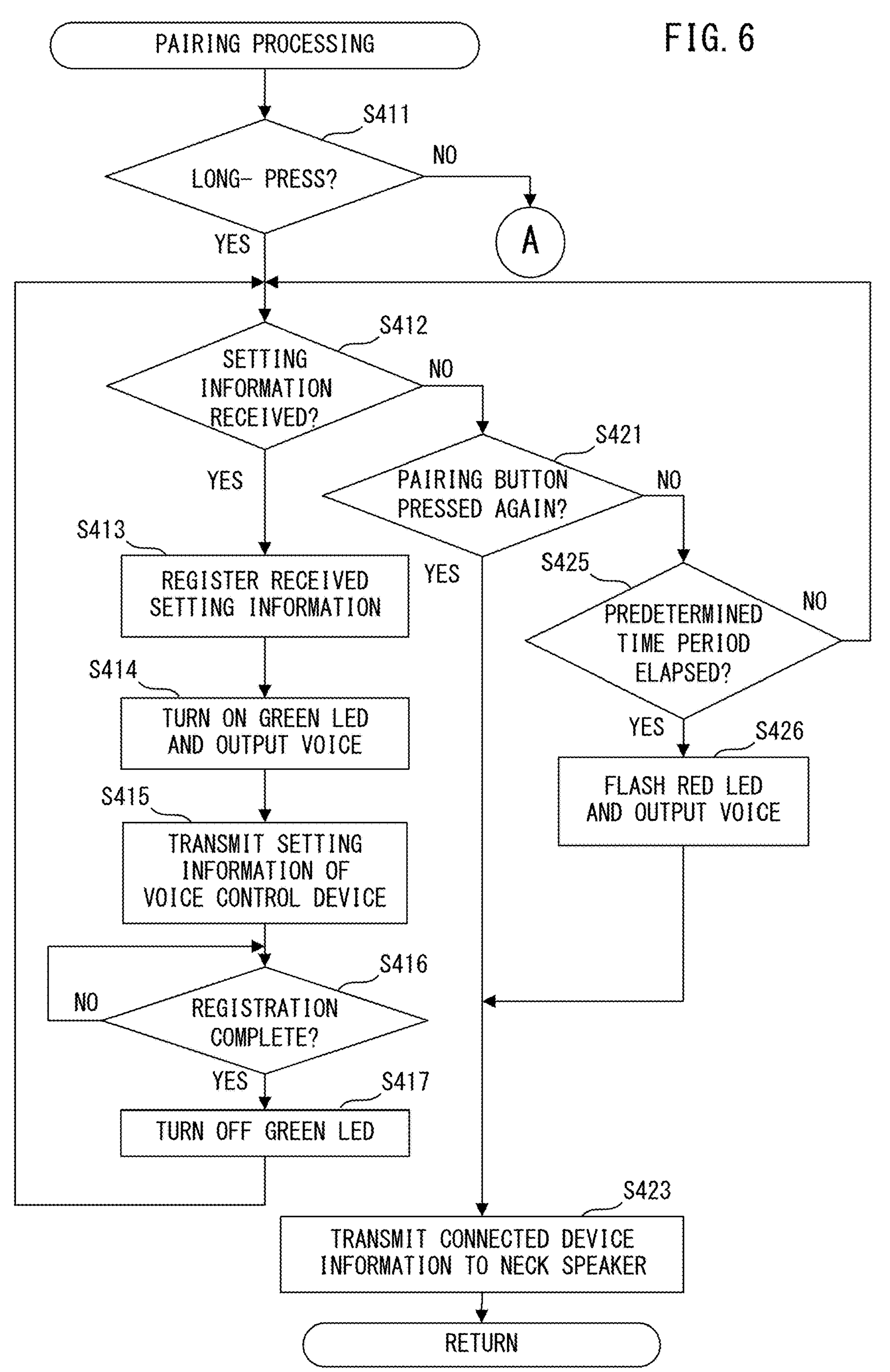
FIG. 6
PAIRING PROCESSING
S411
LONG- PRESS?
NO
YES
A
S412
SETTING INFORMATION RECEIVED?
NO
S421
PAIRING BUTTON PRESSED AGAIN?
NO
YES
S413
REGISTER RECEIVED SETTING INFORMATION
YES
S425
PREDETERMINED TIME PERIOD ELAPSED?
NO
S414
TURN ON GREEN LED AND OUTPUT VOICE
YES
S426
FLASH RED LED AND OUTPUT VOICE
S415
TRANSMIT SETTING INFORMATION OF VOICE CONTROL DEVICE
S416
NO
REGISTRATION COMPLETE?
YES
S417
TURN OFF GREEN LED
S423
TRANSMIT CONNECTED DEVICE INFORMATION TO NECK SPEAKER
RETURN USER AUTHENTICATION PROCESSING
B
S451
VOICE DATA ACQUIRED?
NO
YES
S452
VOICEPRINT AUTHENTICATION
S453
REGISTERED USER?
NO
YES
S456
TRANSMIT FAILURE CODE
S457
FAILED PREDETERMINED NUMBER OF TIMES?
NO
YES
S461
CORRECT PASSCODE INPUT?
YES
NO
S462
FAILED PREDETERMINED NUMBER OF TIMES?
NO
YES
S463
TRANSMIT FAILURE CODE
S454
TRANSMIT SUCCESS CODE
TRANSMIT END CODE
S465
RETURN
S466
POWER OFF
END COMMAND IDENTIFICATION PROCESSING
D
VOICE DATA AND DETECTION CODE ACQUIRED?
S471
NO
YES
NECK SPEAKER BEING WORN?
S472
NO
YES
VOICE RECOGNITION
S474
COMMAND INDNTIFICATION
S475
COMMAND IDENTIFIED?
S476
NO
YES
TRANSMIT IDENTIFICATION FALURE CODE
S478
TRANSMIT RE-AUTHENTICATION REQUEST CODE
S479
B
RETURN

FIG. 10

| COMMAND TEXT DATA | COMMAND ID | LIMITATION DISCRIMINATION CODE | DEVICE TEXT DATA | DEVICE ID |
|---|---|---|---|---|
| "SET ROTATION SPEED TO N" | 0001 (ROTATION SPEED CONTROL) | 1 | GRINDER<br>POLISHER | 102<br>108 |
| "INCREASE BRIGHTNESS OF LIGHT"<br>"TURN ON LIGHT ONLY" | 0002 (LIGHT AMOUNT CONTROL) | 0 | ILLUMINATION DEVICE<br>IMPACT DRIVER<br>GRINDER<br>⋮ | 103<br>101<br>102<br>⋮ |
| "SELECT EASY MODE"<br>"CHANGE MODE TO MODE 4" | 0003 (CHANGE OF MODE) | 1 | IMPACT DRIVER<br>AIR DUSTER | 101<br>107 |
| "START CLEANING AT 18:00" | 0004 (ACTIVATION TIME SETTEING) | 0 | ROBOT CLEANER | 117 |
| ⋮ | ⋮ | ⋮ | ⋮ | ⋮ |

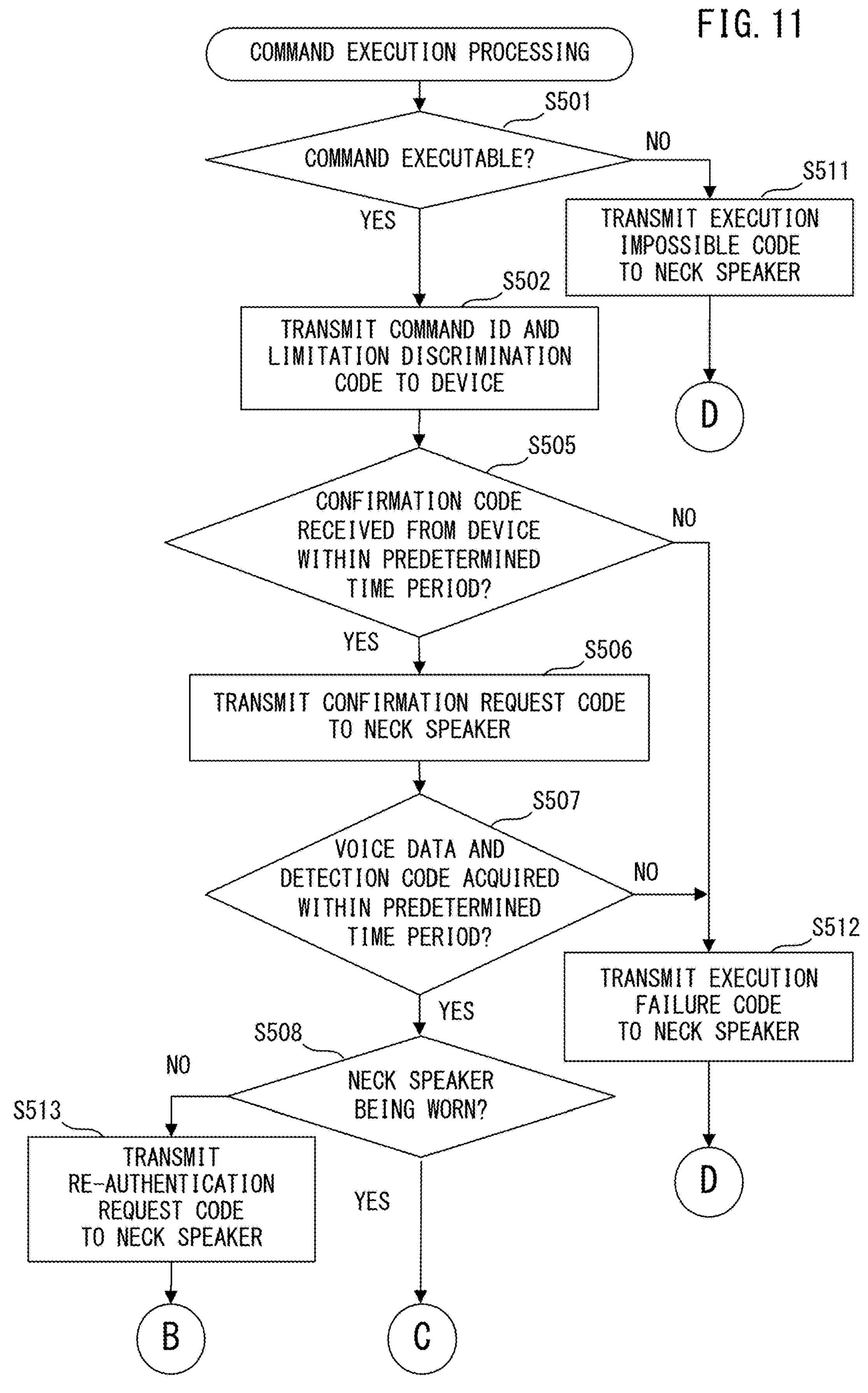
FIG. 11
COMMAND EXECUTION PROCESSING
S501
COMMAND EXECUTABLE?
NO
YES
S511
TRANSMIT EXECUTION IMPOSSIBLE CODE TO NECK SPEAKER
D
S502
TRANSMIT COMMAND ID AND LIMITATION DISCRIMINATION CODE TO DEVICE
S505
CONFIRMATION CODE RECEIVED FROM DEVICE WITHIN PREDETERMINED TIME PERIOD?
NO
YES
S506
TRANSMIT CONFIRMATION REQUEST CODE TO NECK SPEAKER
S507
VOICE DATA AND DETECTION CODE ACQUIRED WITHIN PREDETERMINED TIME PERIOD?
NO
YES
S512
TRANSMIT EXECUTION FAILURE CODE TO NECK SPEAKER
D
S508
NECK SPEAKER BEING WORN?
NO
YES
S513
TRANSMIT RE-AUTHENTICATION REQUEST CODE TO NECK SPEAKER
B
C

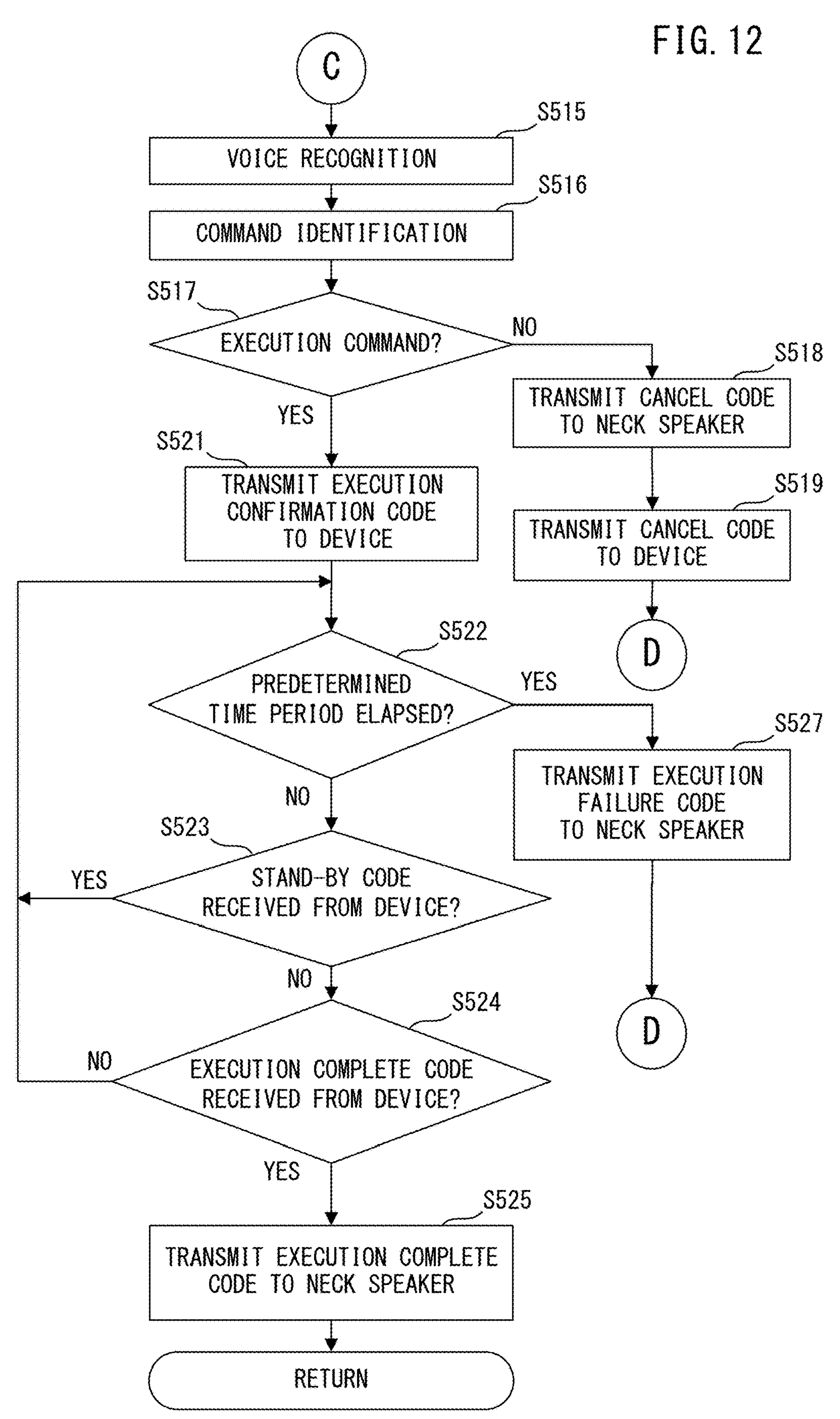
FIG. 12
C
S515
VOICE RECOGNITION
S516
COMMAND IDENTIFICATION
S517
EXECUTION COMMAND?
NO
S518
TRANSMIT CANCEL CODE TO NECK SPEAKER
S519
TRANSMIT CANCEL CODE TO DEVICE
D
YES
S521
TRANSMIT EXECUTION CONFIRMATION CODE TO DEVICE
S522
PREDETERMINED TIME PERIOD ELAPSED?
YES
S527
TRANSMIT EXECUTION FAILURE CODE TO NECK SPEAKER
D
NO
S523
STAND-BY CODE RECEIVED FROM DEVICE?
YES
NO
S524
EXECUTION COMPLETE CODE RECEIVED FROM DEVICE?
NO
YES
S525
TRANSMIT EXECUTION COMPLETE CODE TO NECK SPEAKER
RETURN

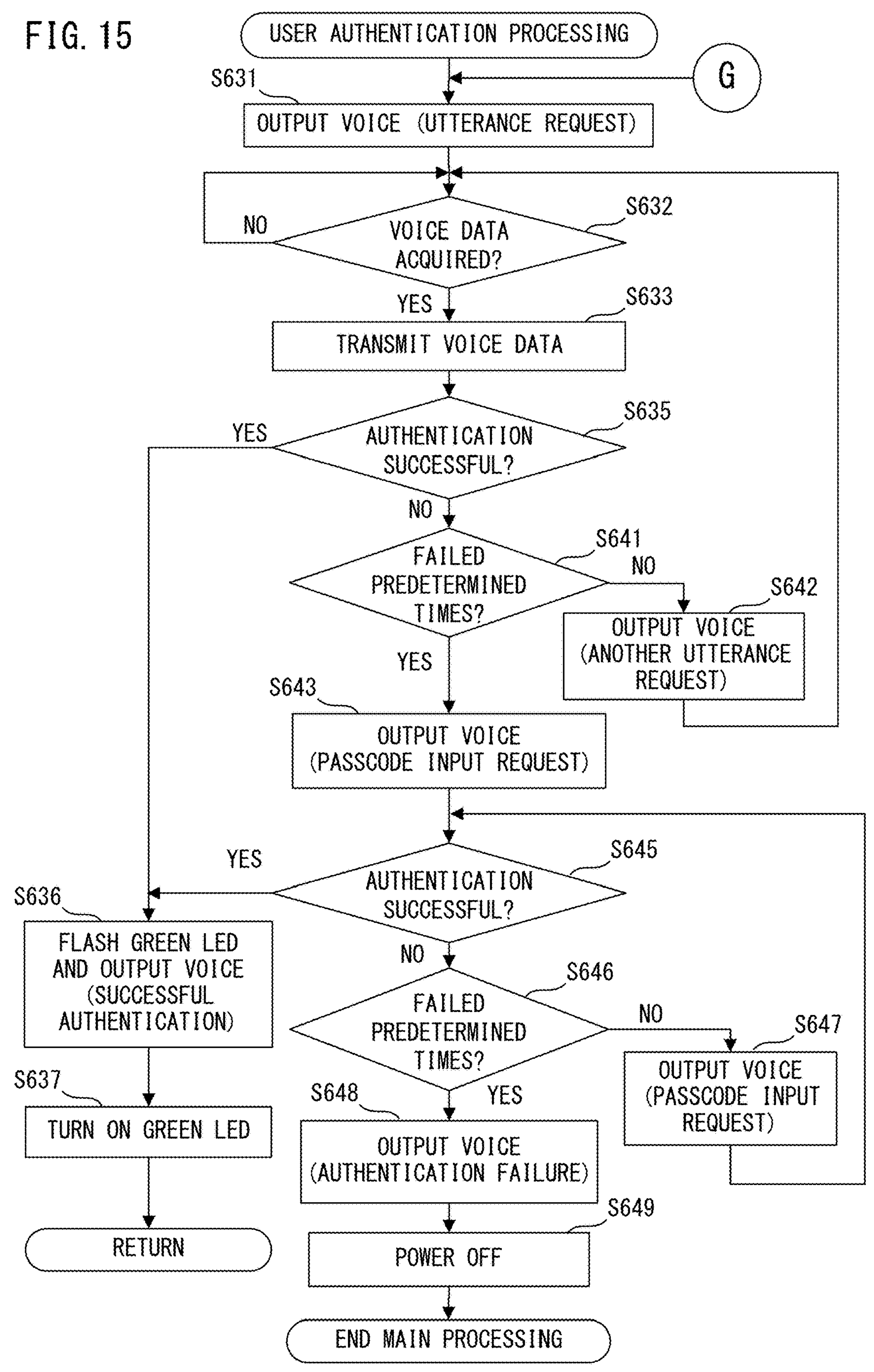
FIG. 15
USER AUTHENTICATION PROCESSING
G
S631
OUTPUT VOICE (UTTERANCE REQUEST)
S632
VOICE DATA ACQUIRED?
NO
YES
S633
TRANSMIT VOICE DATA
S635
AUTHENTICATION SUCCESSFUL?
YES
NO
S641
FAILED PREDETERMINED TIMES?
NO
S642
OUTPUT VOICE (ANOTHER UTTERANCE REQUEST)
YES
S643
OUTPUT VOICE (PASSCODE INPUT REQUEST)
S645
AUTHENTICATION SUCCESSFUL?
YES
S636
FLASH GREEN LED AND OUTPUT VOICE (SUCCESSFUL AUTHENTICATION)
NO
S646
FAILED PREDETERMINED TIMES?
NO
S647
OUTPUT VOICE (PASSCODE INPUT REQUEST)
S637
TURN ON GREEN LED
S648
YES
OUTPUT VOICE (AUTHENTICATION FAILURE)
S649
POWER OFF
RETURN
END MAIN PROCESSING

POWER TOOL SYSTEM

CROSS-REFERENCE TO RELATED APPLICATIONS

The present application claims priority to Japanese patent application no. 2023-083927 filed on May 22, 2023, the contents of which are hereby fully incorporated herein by reference.

TECHNICAL FIELD

The present disclosure relates to a power tool system that includes a power tool and a voice control device.

BACKGROUND

JP 2018-108619 A discloses a power tool that includes a connection portion to which a plurality of types of auxiliary adaptor can be electrically and mechanically connected. This power tool can control driving of a drive portion on the basis of information that is acquired via the auxiliary adaptor connected to the connection portion. A voice command device, which is an example of the auxiliary adaptor, includes a microphone that collects the voice of a user, generates control information in accordance with content of a command included in the voice, and provides the control information to the power tool. A drive control portion of the power tool controls the drive portion in accordance with the control information acquired from the voice command device.

SUMMARY

The above-described power tool is operated on the basis of the voice command of the user only when the auxiliary adaptor, which is configured as the voice command device, is electrically and mechanically connected to the power tool. Thus, for example, the voice command is only possible when the user is within a given distance range from the power tool.

One non-limiting object of the present disclosure is to provide improvement relating to voice control technology of a power tool system including a power tool.

A non-limiting embodiment of the present disclosure herein provides a power tool system that includes at least one controlled device and a voice control device. The at least one controlled device includes a power tool. The voice control device is configured to wirelessly communicate with the at least one controlled device. The voice control device includes at least one first processor that is configured to control operation of the at least one controlled device. The at least one first processor is configured to (i) acquire voice data, and (ii) control operation of the power tool in accordance with a command that relates to the operation of the power tool and that is identified based on the voice data.

Note that the power tool according to the present disclosure includes not only tools for processing operations (drilling, tightening, chipping, cutting, grinding, polishing, for example) on a workpiece, but also includes outdoor power equipment for outdoor operations (mowing, cutting of garden plants, for example).

The at least one controlled device according to the present disclosure may include: (i) only one power tool; (ii) a plurality of power tools only (these may be power tools all of the same type, or at least one of the power tools may be a different type); or (iii) at least one power tool and at least one device (an electric appliance/electronic equipment) other than the power tool. Examples of the device other than the power tool may include an illumination device, a cleaner, a radio, an electric kettle, or the like that are used at a worksite at which the power tool is used.

The at least one first processor may acquire the voice data via a voice input portion (a microphone, for example) provided in the voice control device, or may acquire the voice data transmitted from an external device that is connected to the voice control device. Further, the at least one first processor may identify the command by processing the acquired voice data, and may control the operation of the power tool in accordance with the identified command. Alternatively, the voice control device may transmit the acquired voice data to an external information processing device (a server, for example) that is connected to the voice control device. In this case, the server may process the voice data and transmit, to the voice control device, text obtained from the voice data, or information relating to the identified command, and the voice control device may identify the command from the received information.

According to this embodiment, as long as the voice control device can acquire the voice data of the command and can communicate wirelessly with the power tool, a user can issue a voice command at a location further away from the power tool, compared to a known system in which a voice control device is provided in a power tool. Thus, for example, the voice control device of the present disclosure can be placed at a location where the voice control device is less likely to be affected by dust or noise that are generated during the processing operation by the power tool. Further, for example, a person (a worksite supervisor, for example) who is different from a person actually performing the operation using the power tool can issue an appropriate command using voice. Furthermore, it is possible to control multiple power tools based on the voice command, using the single voice control device.

BRIEF DESCRIPTION OF THE DRAWINGS

FIG. 2 is a diagram illustrating a hardware configuration of the power tool system.

FIG. 4 is a flowchart of user registration processing performed by a voice control device.

FIG. 6 is a flowchart of pairing processing performed in the main processing.

FIG. 10 is an explanatory diagram of a specific example of command identification information.

FIG. 11 is a flowchart of command execution processing performed in the main processing.

FIG. 12 is a flowchart of the command execution processing, and is a continuation of FIG. 11.

FIG. 15 is a flowchart of user authentication processing performed in the main processing.

DETAILED DESCRIPTION OF THE EMBODIMENTS

Figure 1:
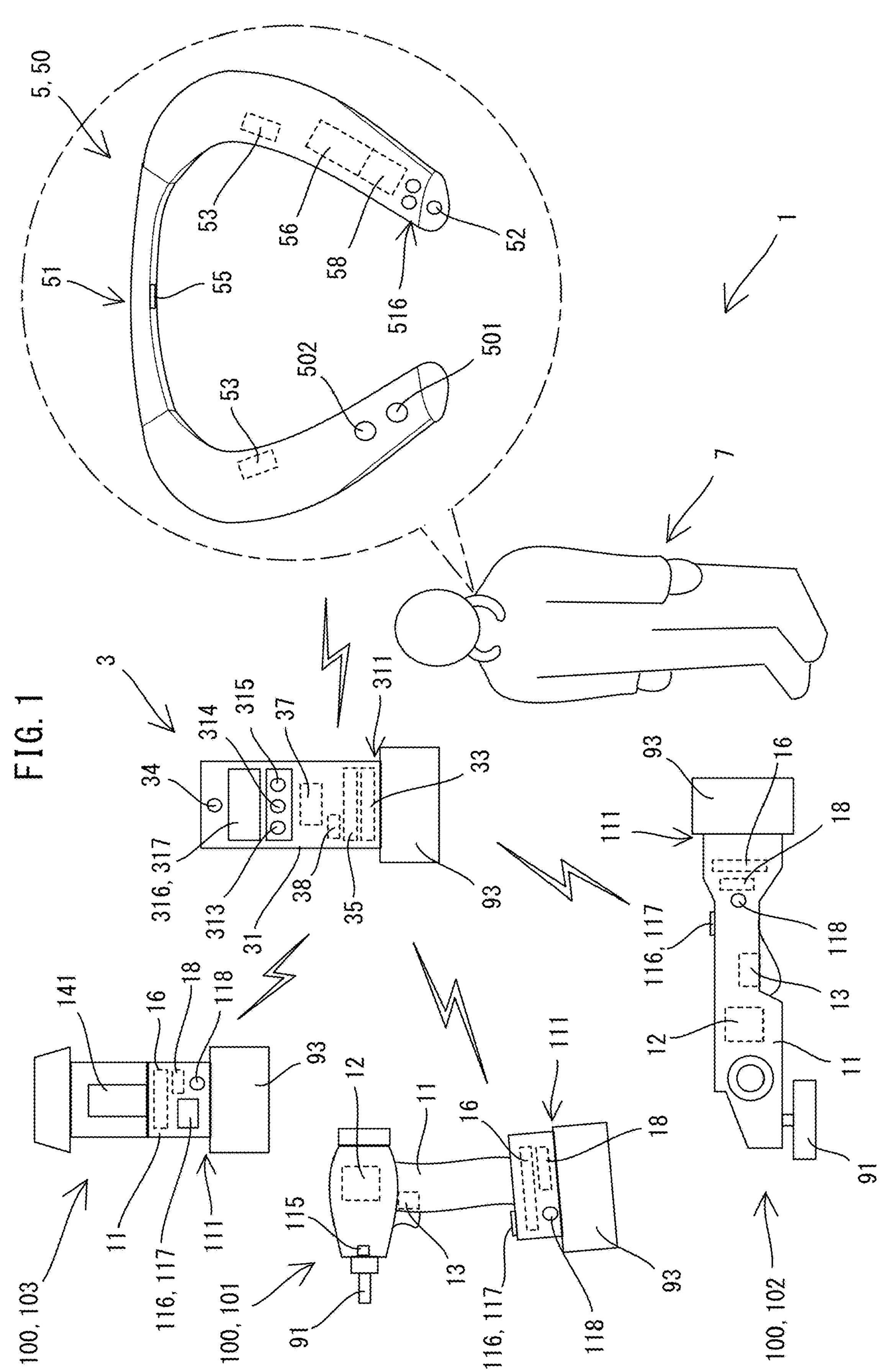
FIG. 1 is an explanatory diagram of an overall configuration of a power tool system.

Another non-limiting embodiment of the present disclosure herein provides a power tool system that includes at least one controlled device and a voice control device. The at least one controlled device includes a power tool. The voice control device is configured to wirelessly communicate with the at least one controlled device. The voice control device includes a system controller that is configured to control operation of the at least one controlled device. The system controller is configured to (i) acquire voice data, and (ii) control operation of the power tool in accordance with a command that relates to the operation of the power tool and that is identified based on the voice data.

The system controller may be realized by at least one processor and at least one memory, for example. Further, functions of the system controller may be realized, for example, by executing a program stored in a non-volatile storage device. The system controller may control the operation of the at least one controlled device by transmitting control information to the at least one controlled device, for example.

The system controller may acquire the voice data via a voice input portion (a microphone, for example) provided in the voice control device, or may acquire the voice data transmitted from an external device that is connected to the voice control device. Further, the system controller may identify the command by processing the acquired voice data, and may control the operation of the power tool in accordance with the identified command. Alternatively, the voice control device may transmit the acquired voice data to an external information processing device (a server, for example) that is connected to the voice control device. In this case, the server may process the voice data and transmit, to the voice control device, text obtained from the voice data, or information relating to the identified command, and the voice control device may identify the command from the received information.

In addition to the above-described embodiment, or in place of the non-limiting embodiment of the present disclosure, the power tool system may further include a user device that is configured to wirelessly communicate with the voice control device. The user device may include a voice input portion and a device controller. The voice input portion may be configured to receive an input of voice and to convert the voice to the voice data. The device controller may be configured to control operation of the user device. The device controller may be configured to transmit, to the voice control device, the voice data generated by the voice input portion. According to this embodiment, since the voice command is received by the user device that is separate from the voice control device, a user (a person speaking, a person issuing a command) who issues the voice command may be spaced away from the power tool and the voice control device. Thus, convenience is improved.

In addition to the above-described embodiments, or in place of the above-described embodiments, the user device may further include a voice output portion that is configured to output voice. The system controller may be configured to control the output of the voice output portion. According to this embodiment, by outputting appropriate voice from the voice output portion, the system controller can request a user of the user device to make a required utterance or perform a required operation.

In addition to the above-described embodiments, or in place of the above-described embodiments, the user device may be a wearable device. According to this embodiment, since the user does not need to hold the user device by hand, convenience is improved. Note that, examples of the wearable device may include a neck speaker (also referred to as a neckband speaker), a smart watch, smart earphones/earbuds, smart glasses, a smart jacket.

In addition to the above-described embodiments, or in place of the above-described embodiments, the wearable device may be a neck speaker that is wearable around the neck of a person. According to this embodiment, the voice input portion can be disposed at a position close to the mouth of the user, and this is desirable as a voice input is less likely to be influenced by noise.

In addition to the above-described embodiments, or in place of the above-described embodiments, the wearable device may further include a detection portion that is configured to detect whether the wearable device is being worn. The device controller may be configured to transmit, to the voice control device, information indicating whether the wearable device is being worn, in accordance with a detection result by the detection portion. The system controller may be configured to perform different processing depending on when the system controller receives information indicating that the wearable device is not being worn and when the system controller receives information indicating that the wearable device is being worn. For example, when the wearable device is not being worn, it is possible for the system controller to not execute the command. Alternatively, when the wearable device is not being worn, the system controller can execute the command after a predetermined condition is satisfied. According to this embodiment, for example, in case that the wearable device is removed or a person wearing the device changes after the voice command has been issued from the wearable device, it is possible to avoid unintentional execution of the command.

In addition to the above-described embodiments, or in place of the above-described embodiments, the voice control device may include a battery mounting portion. The voice control device may be configured to operate using power supplied from a rechargeable battery detachably mounted to the battery mounting portion. The battery may be selectively mountable to multiple types of power tools. According to this embodiment, for example, the battery mounted to a power tool that is not being used can be removed and used as a power source for the voice control device, and thus convenience is improved.

In addition to the above-described embodiments, or in place of the above-described embodiments, the system controller may be configured to perform at least one of voice recognition of the voice data and identification of the command, using a machine-learned model (a learned/trained model obtained by machine learning). According to this embodiment, by generating the machine-learned model in advance using appropriate machine learning, it is possible to perform either one or both of the voice recognition of the voice data and the identification of the command with a high degree of accuracy. Note that the machine-learned model may be generated in advance by machine learning in the voice control device. Alternatively, the machine-learned model may be generated in an information processing device other than the voice control device. This case may be desirable since a high-performance processing device for the machine learning is not needed in the voice control device. The machine-learned model may be stored in a non-volatile storage device of the voice control device, for example.

In addition to the above-described embodiments, or in place of the above-described embodiments, the system controller may be configured to perform (i) voiceprint authentication using the voice data and comparison data of at least one registered user, and (ii) determine whether voice represented by the voice data is voice of the at least one registered user. The system controller may be configured to cause the power tool to operate in accordance with the command only if the system controller determines that the voice represented by the voice data is the voice of the at least one registered user. According to this embodiment, by allowing only a person who satisfies a predetermined condition (a skilled operator, a worksite supervisor, for example) to be the registered user, it is possible to reduce the possibility of an inappropriate voice command being executed.

In addition to the above-described embodiments, or in place of the above-described embodiments, the at least one controlled device may include the wearable device. The wearable device may further include a voice output portion that is configured to output voice. The system controller may be configured to output voice from the voice output portion requesting an utterance for performing the voiceprint authentication once more in response to the system controller receiving the information, from the wearable device, indicating that the wearable device is not being worn. According to this embodiment, it is possible to reduce the possibility of executing an inappropriate voice command issued by a different person due to the wearable device being removed from the person authenticated as the registered user, after the voiceprint authentication.

In addition to the above-described embodiments, or in place of the above-described embodiments, the system controller may be configured to confirm, with a user, whether execution of the command is allowed, before causing the power tool to perform the operation in accordance with the command. According to this embodiment, the user who has issued the voice command can cancel the execution of the command afterwards, if the user wishes to do so.

In addition to the above-described embodiments, or in place of the above-described embodiments, the system controller may be configured to determine whether the command identified based on the voice data is executable without limitation in the power tool. The system controller may be further configured to perform different processing depending on when the command is determined not to be executable without limitation and when the command is determined to be executable without limitation. For example, when the identified command is not executable without limitation, it is possible for the system controller to not execute the command. Alternatively, the system controller can execute the command after a predetermined condition is satisfied. According to this embodiment, by setting the limitation in accordance with the operation that corresponds to the command, the power tool can be even more appropriately controlled.

In addition to the above-described embodiments, or in place of the above-described embodiments, the power tool may include a motor and a tool controller. When the tool controller receives control information for executing the command from the voice control device during driving of the motor, the tool controller may cause the power tool to operate in accordance with the control information after the driving of the motor is stopped. According to this embodiment, it is possible to prevent the command from being unintentionally executed during the driving of the motor, and thus, the power tool can be even more appropriately controlled.

Hereinafter, a power tool system 1 according to a representative and non-limiting embodiment of the present disclosure will be described with reference to the drawings.

First, an overview of the power tool system 1 will be described with reference to FIG. 1.

The power tool system 1 includes a voice control device 3, at least one controlled device 100 (hereinafter simply referred to as the "device 100"), and a user device 5. The at least one device 100 and the user device 5 are respectively connected to the voice control device 3 in a wirelessly communicable manner. In the power tool system 1 illustrated in FIG. 1, the at least one device 100 includes a plurality of the devices 100 of different types.

The voice control device 3 is configured to selectively control operations of the at least one device 100 and the user device 5 (specifically, a neck speaker 50), which are connected to the voice control device 3 in the wirelessly communicable manner, based on a command included in voice of a user 7 of the user device 5. The voice control device 3 can also be referred to as a voice assistant device.

The devices 100 include at least one power tool. Further, the devices 100 may include at least one device of a different type from the power tool (an electrical appliance, electronic equipment, for example). A type and number of the power tools and the devices other than the power tool are not particularly limited. In the example illustrated in FIG. 1, the devices 100 include an impact driver 101, a grinder 102, and an illumination device 103. Each of the impact driver 101 and the grinder 102 is an example of the power tool that performs a processing operation by driving a tool accessory 91 using the power of a motor 12. The illumination device 103 is an electrical appliance used for lighting. The impact driver 101, the grinder 102, and the illumination device 103 can be simultaneously used at the same worksite. Note that, hereinafter, when the plurality of devices 100 is collectively referred to, or when at least one of the devices 100 is specified without distinction, it is simply referred to as the device 100.

The user device 5 is a device that is used by the user 7 to input a voice command. The user device 5 can be disposed in the vicinity of the user 7, or can be used while being worn by the user 7. In the example according to the present embodiment illustrated in FIG. 1, the neck speaker 50 is employed as the user device 5. The neck speaker 50 is an example of a wearable device that does not need to be held by hand, and can be worn around the neck of the user 7. The neck speaker 50 includes a microphone 52, which is an example of a voice input device. The voice of the user 7 is input to the microphone 52, and is converted to voice data.

In the power tool system 1, the user 7 utters the voice command, in order to cause at least one of the devices 100 to perform a desired operation. The voice data generated by the microphone 52 of the neck speaker 50 is transmitted to the voice control device 3. By transmitting, to the device 100 targeted by the command, control information (a signal) corresponding to the command that is identified based on the acquired voice data, the voice control device 3 controls the operation of that device 100. Note that the user 7 who issues the voice command using the neck speaker 50, and a user or an operator of the device 100 (an operator/worker using the power tool, for example) need not necessarily be the same person and can be different from each other.

Hereinafter, a detailed configuration of the power tool system 1 will be described with reference to FIG. 1 and FIG. 2.

First, the device 100 (the impact driver 101, the grinder 102, and the illumination device 103) will be described. Note that the same reference signs will be assigned to a shared configuration (a configuration that has substantially the same function) of the impact driver 101, the grinder 102, and the illumination device 103 and a description thereof will be omitted.

The impact driver 101 is a power tool for a fastening operation of a screw or the like. The impact driver 101 is configured to impart a blow (impact) in a rotational direction when a load of a certain amount or greater is applied during rotational driving of the tool accessory 91, which is referred to as a bit.

As illustrated in FIG. 1, a housing 11 of the impact driver 101 houses the motor 12, a switch 13 for activating the motor 12, a communication portion 18 that is configured to communicate wirelessly with an external device, and a controller 16 that is configured to control the operation of the impact driver 101. The switch 13 is normally kept off and is turned on when a trigger provided at the housing 11 is pressed.

The housing 11 includes a battery mounting portion 111 that is configured to receive a battery 93 in a detachable manner. Specifically, the battery mounting portion 111 includes an engagement portion that is configured to physically engage with the battery 93, and a terminal portion that is configured to be electrically connected to terminals of the battery 93. Since the configuration of this type of the battery mounting portion 111 is known, a detailed illustration and description thereof are omitted here. When the battery 93 is mounted to the battery mounting portion 111, power from the battery 93 is supplied to each of the portions of the impact driver 101 other than the communication portion 18. The battery 93 can be used commonly by power tools other than the impact driver 101 (the grinder 102, for example), and specific electrical appliances (the illumination device 103, for example). Further, rather than the battery 93, the power may be supplied to the device 100 from an external AC power source via a power cord.

Further, an LED light 115, a manipulation portion 116, a reporting portion 117, and a pairing button 118 are provided at the housing 11.

The LED light 115 is an illumination device that includes an LED light source. The LED light 115 is attached to the housing 11 such that the LED light source illuminates a region where tool accessory 91 performs the operation.

The manipulation portion 116 is provided at the surface of the housing 11 so as to be manually operable, for inputting various pieces of information. The manipulation portion 116 may be configured as a push-button switch, a touch screen, or the like, for example. The manipulation portion 116 is manipulated to input information for setting a rotation speed of the motor 12, turning the LED light 115 on and off, setting an amount of light (light amount) of the LED light 115, for example. Further, the impact driver 101 has multiple modes corresponding to various impact strengths. Thus, the manipulation portion 116 is also manipulated to input information for selecting the mode.

The reporting portion 117 is provided at the surface of the housing 11. The reporting portion 117 is configured to report information. The reporting portion 117 may be any device that reports information using a display, light, sound. In the present embodiment, the reporting portion 117 includes two LEDs, one green and one red, and is configured to report (notify, indicate) various pieces of information by varying a drive state (ON, flashing, OFF) of each of the LEDs. As will be described in more detail below, in the present embodiment, the reporting portion 117 is used to provide information to the person (the operator) performing the operation using the impact driver 101, for example.

The pairing button 118 is a manipulation portion that is manually operable for starting pairing. “Pairing” means registering setting information of a counterpart device, in order to establish a state in which wireless one-to-one communication is possible between two devices. As will be described in more detail below, when the pairing button 118 of the impact driver 101 is pressed, and a pairing button 314 of the voice control device 3 is also pressed, predetermined information is transmitted and received between the impact driver 101 and the voice control device 3. After the pairing is complete, the wireless one-to-one communication is possible between the impact driver 101 and the voice control device 3.

As illustrated in FIG. 2, the controller 16 of the impact driver 101 is electrically connected to each of the above-described switch 13, communication portion 18, LED light 115, manipulation portion 116, reporting portion 117, and pairing button 118. Further, the controller 16 is electrically connected to a motor drive circuit 121 for driving the motor 12.

The controller 16 includes at least one processor/processing circuit (a CPU, an application specific integrated circuit (ASIC), a field programmable gate array (FPGA), for example), and at least one memory. In the present embodiment, a microcomputer, which includes a CPU 161, a ROM 162, a RAM 163, a non-volatile memory 164, and the like, is employed as the controller 16.

The communication portion 18 is configured to be wirelessly connectable to the voice control device 3. The communication portion 18 may have any known configuration, as long as the wireless transmission and reception of information (data, signals) with a communication portion 38 of the voice control device 3 is possible, in accordance with a predetermined standard. The communication portion 18 may be configured as a wireless unit/wireless module, for example. Note that supply of power to the communication portion 18 is started in response to pressing of the pairing button 118, as will be described below, so that unnecessary consumption of power is reduced while the wireless communication is not being performed.

The controller 16 controls the operation of the impact driver 101 in accordance with a state of the switch 13 and/or information input from the manipulation portion 116. Further, in a state in which the wireless communication is established between the impact driver 101 and the voice control device 3 (in a state in which the pairing is complete), the controller 16 acquires control information, which is received from the voice control device 3, via the communication portion 18. The controller 16 controls the operation of the impact driver 101 (driving of the motor 12, driving of the LED light 115, driving of the LEDs of the reporting portion 117, and changing of the mode, for example), in accordance with the control information transmitted from the voice control device 3.

The grinder 102 illustrated in FIG. 1 is a known rotary tool that performs a processing operation of grinding, polishing, cutting, or the like, by rotationally driving the tool accessory 91 having a disc shape (a grindstone, a rubber pad, a brush, or a blade, for example). In a similar manner to the impact driver 101, the grinder 102 includes the motor 12, the switch 13, the controller 16, and the communication portion 18 housed in the housing 11. The battery mounting portion 111, the manipulation portion 116, the reporting portion 117, and the pairing button 118 are provided at the housing 11.

The hardware configuration of the grinder 102 is substantially the same as that of the impact driver 101, except that the grinder 102 does not include the LED light 115. A detailed illustration and description thereof is thus omitted. In a similar manner to the impact driver 101, the controller 16 of the grinder 102 controls the operation of the grinder 102 (the driving of the motor 12, for example) in accordance with the state of the switch 13 and/or information input from the manipulation portion 116, or in accordance with the control information transmitted from the voice control device 3.

As illustrated in FIG. 1, the illumination device 103 includes a light source 141, and the controller 16 and the communication portion 18 housed in the housing 11. The battery mounting portion 111, the manipulation portion 116, the reporting portion 117, and the pairing button 118 are provided at the housing 11. The manipulation portion 116 of the illumination device 103 is operated in order to input information for turning the light source 141 on and off, setting a light amount of the light source 141, and the like.

The light source 141 of the illumination device 103 includes LEDs. Although a detailed illustration of the hardware configuration of the illumination device 103 is omitted, the controller 16 is electrically connected to each of the light source 141 (LEDs), the communication portion 18, the manipulation portion 116, the reporting portion 117, and the pairing button 118. In a similar manner to the impact driver 101, the controller 16 of the illumination device 103 controls the operation of the illumination device 103 (the turning on and off of the light source 141, the light amount of the light source 141, for example) in accordance with the state of the switch 13 and/or information input from the manipulation portion 116, or in accordance with control information transmitted from the voice control device 3.

Hereinafter, the neck speaker 50 (the user device 5) will be described.

As illustrated in FIG. 1, the neck speaker 50 includes a main body 51 formed in a C shape/U shape. The main body 51 is normally worn such that a central portion of the main body 51 is disposed at the rear side of the neck of the user 7, and two side portions extending from both ends of the central portion extend to the front of the neck.

The microphone 52, a power switch 501, a pairing button 502, a wear detection portion 55, and a reporting portion 516 are provided at the main body 51. Speakers 53, a communication portion 58, and a controller 56 are housed inside the main body 51.

The microphone 52 is at one end of the main body 51. In other words, the microphone 52 is provided at a portion that is to be disposed relatively close to the mouth of the user 7. Such arrangement has an advantage that a voice input is less likely to be influenced by noise. The microphone 52 converts the input voice into voice data (voice signals) and outputs the voice data. Note that, the microphone 52 preferably has directivity specified in a direction toward the mouth when the main body 51 is in a normal worn state.

The power switch 501 and the pairing button 502 are disposed at one of the two side portions, so as to be manually operable. The power switch 501 is turned on and off in response to being pressed. When the power switch 501 is turned on, the power is supplied to each of the portions of the neck speaker 50. Note that, although not illustrated in detail, a rechargeable battery is built into the neck speaker 50. The rechargeable battery can be charged via a cable connected to a charging port. In a similar manner to the pairing button 118 of the device 100, the pairing button 502 is a manipulation portion to be manipulated for starting pairing with the voice control device 3.

The wear detection portion 55 is a detector that is configured to detect that the neck speaker 50 is being worn. The wear detection portion 55 is disposed at the central portion (specifically, an inside section facing the neck of the user 7 when the neck speaker 50 is being worn) of the main body 51. Any known detector may be employed as the wear detection portion 55, as long as the detector can detect that the inside section of the central portion is (i) in contact with the neck of the user 7, or (ii) is in the vicinity the neck of the user 7. For example, any one of various contact switches or various non-contact sensors can be employed.

The reporting portion 516 may be any device, as long as it is configured to report (notify, indicate) information in a visual manner. In the present embodiment, the reporting portion 516 includes two LEDs, one green and one red, and is configured to report various pieces of information by varying a drive state (ON, flashing, OFF) of each of the LEDs. The reporting portion 516 is disposed at one end of the main body 51, so as to be visible to the user 7 when the neck speaker 50 is being worn.

The speaker 53 is a voice output device that outputs voice. In the present embodiment, two speakers 53 are provided at the two side portions of the main body 51 (specifically, portions that are relatively close to the ears). Note, however, that the number of the speakers 53 may be one.

The communication portion 58 is configured to be wirelessly connectable to the voice control device 3. In a similar manner to the communication portion 18 of the device 100, the communication portion 58 may have any known configuration, as long as the wireless transmission and reception of information (data, signals) with the communication portion 38 of the voice control device 3 is possible, in accordance with a predetermined standard.

The controller 56 is a control portion that controls the operation of the neck speaker 50. As illustrated in FIG. 2, the controller 56 is electrically connected to each of the above-described power switch 501, pairing button 502, wear detection portion 55, reporting portion 516, microphone 52, speakers 53, and communication portion 58. The controller 56 includes at least one processor/processing circuit (a CPU, an application specific integrated circuit (ASIC), a field programmable gate array (FPGA), for example) and at least one memory. In the present embodiment, a microcomputer, which includes a CPU 561, a ROM 562, a RAM 563, a non-volatile memory 564, and the like, is employed as the controller 56.

The controller 56 transmits the voice data that is generated by the microphone 52 to the voice control device 3, via the communication portion 58. Further, the voice control device 3 transmits control information to the neck speaker 50 as necessary. In accordance with this control information, by causing voice to be output from the speakers 53, the controller 56 issues a request to the user 7 to speak, drives the LEDs of the reporting portion 516, and the like.

Hereinafter, the voice control device 3 will be described.

As illustrated in FIG. 1, the voice control device 3 includes a housing 31. The voice control device 3 also includes a battery mounting portion 311, a power switch 313, a pairing button 314, a user registration button 315, a microphone 34, a manipulation portion 316, and a reporting portion 317 provided at the housing 31. A speaker 37, a controller 33, the communication portion 38, and a storage portion 35 are housed in the housing 31.

The battery mounting portion 311 is provided at a lower end of the housing 31. The battery mounting portion 311 has substantially the same configuration as the battery mounting portion 111 of the device 100, and is configured to receive the battery 93 in a detachable manner. The voice control device 3 is designed so as to maintain a stable posture when the battery 93 is mounted to the battery mounting portion 311 and the battery 93 is placed on a floor or the ground. As described above, the battery 93 can be used commonly by various power tools, such as the impact driver 101 and the grinder 102, and various specific electrical appliances, such as the illumination device 103. Thus, for example, the battery 93 of a power tool that is not being used at the worksite can be used for supplying power to the voice control device 3.

The power switch 313, the pairing button 314, and the user registration button 315 are disposed at the surface of the housing 31 so as to be manually operable. The power switch 313 is turned on and off in response to being pressed. When the power switch 313 is turned on, the power is supplied to each of the portions of the voice control device 3. The pairing button 314 is a manipulation portion for starting pairing with the device 100 and the neck speaker 50. The user registration button 315 is a manipulation portion for starting user registration processing. When the user registration button 315 is turned on, the power is supplied to the portions of the voice control device 3 other than the communication portion 38. As will be described in detail below, in the user registration processing, information that relates to a person who is allowed to operate the device 100 using the voice command via the voice control device 3 is stored in the voice control device 3.

The microphone 34 converts input voice into voice data (voice signals) and outputs the voice data. As will be described in detail below, in the user registration processing, the voice data generated by the microphone 34 is stored in the voice control device 3.

The speaker 37 is a voice output device that outputs voice. As will be described in detail below, in the present embodiment, the reporting portion 317 is used, for example, to provide information to a person who is attempting to register information in the user registration processing.

The manipulation portion 316 is provided at the surface of the housing 31 so as to be manually operable, for inputting various pieces of information. The manipulation portion 316 may be configured as a push-button switch, a touch screen, for example. The manipulation portion 316 is used, for example, in order to input a passcode in the user registration processing.

The reporting portion 317 is provided at the surface of the housing 31 and is configured to report (notify, indicate) information. The reporting portion 317 may be any device that reports information using a display, light, sound, or the like. In the present embodiment, the reporting portion 317 includes two LEDs, one green and one red. In place of that, for example, a display may be employed that can display text information. The reporting portion 317 is used to provide information in a visual manner to the person attempting to register information in the user registration processing, for example.

As illustrated in FIG. 2, the controller 33 is electrically connected to each of the above-described power switch 313, pairing button 314, user registration button 315, microphone 34, speaker 37, and reporting portion 317. The controller 33 is further electrically connected to the communication portion 38 and the storage portion 35.

The controller 33 controls the operation of the voice control device 3. Further, the controller 33 controls the operations of the device 100 and the neck speaker 50 by transmitting control information to each of the device 100 and the neck speaker 50. The controller 33 includes at least one processor/processing circuit (a CPU, an application specific integrated circuit (ASIC), a field programmable gate array (FPGA), for example) and at least one memory. In the present embodiment, a microcomputer, which includes a CPU 331, a ROM 332, a RAM 333, a non-volatile memory 334, and the like is employed as the controller 33.

The communication portion 38 is configured to be wirelessly connectable to the device 100 and the neck speaker 50. The communication portion 38 may have any known configuration, as long as the wireless transmission and reception of information (data, signals) with the communication portion 18 of the device 100 and with the communication portion 58 of the neck speaker 50 is possible, in accordance with a predetermined standard.

The storage portion 35 is a storage device that is separate from the memory 334 of the controller 33. The storage portion 35 includes a storage medium, such as a semiconductor memory device and a magnetic disk device or the like. The storage portion 35 stores, for example, (i) information obtained in the user registration processing, (ii) information for outputting voice used to present information from the speaker 37, (iii) setting information of the devices 100 that have been paired with the voice control device 3 in the past, and (iv) information for controlling the operation of the devices 100. Further, as will be described in detail below, in the present embodiment, in the voice control device 3, voice recognition is performed based on the voice data acquired from the neck speaker 50. A voice recognition model, which is to be used in the voice recognition, is stored in the storage portion 35.

Hereinafter, processing performed by the power tool system 1 will be described.

First, with reference to FIG. 3, an overall flow will be described of processing performed in the power tool system 1 as a whole when the voice control device 3 controls the device 100 based on the voice command of the user 7 of the neck speaker 5. Note that in the following description and in the drawings, "step" is abbreviated to "S".

Figure 3:
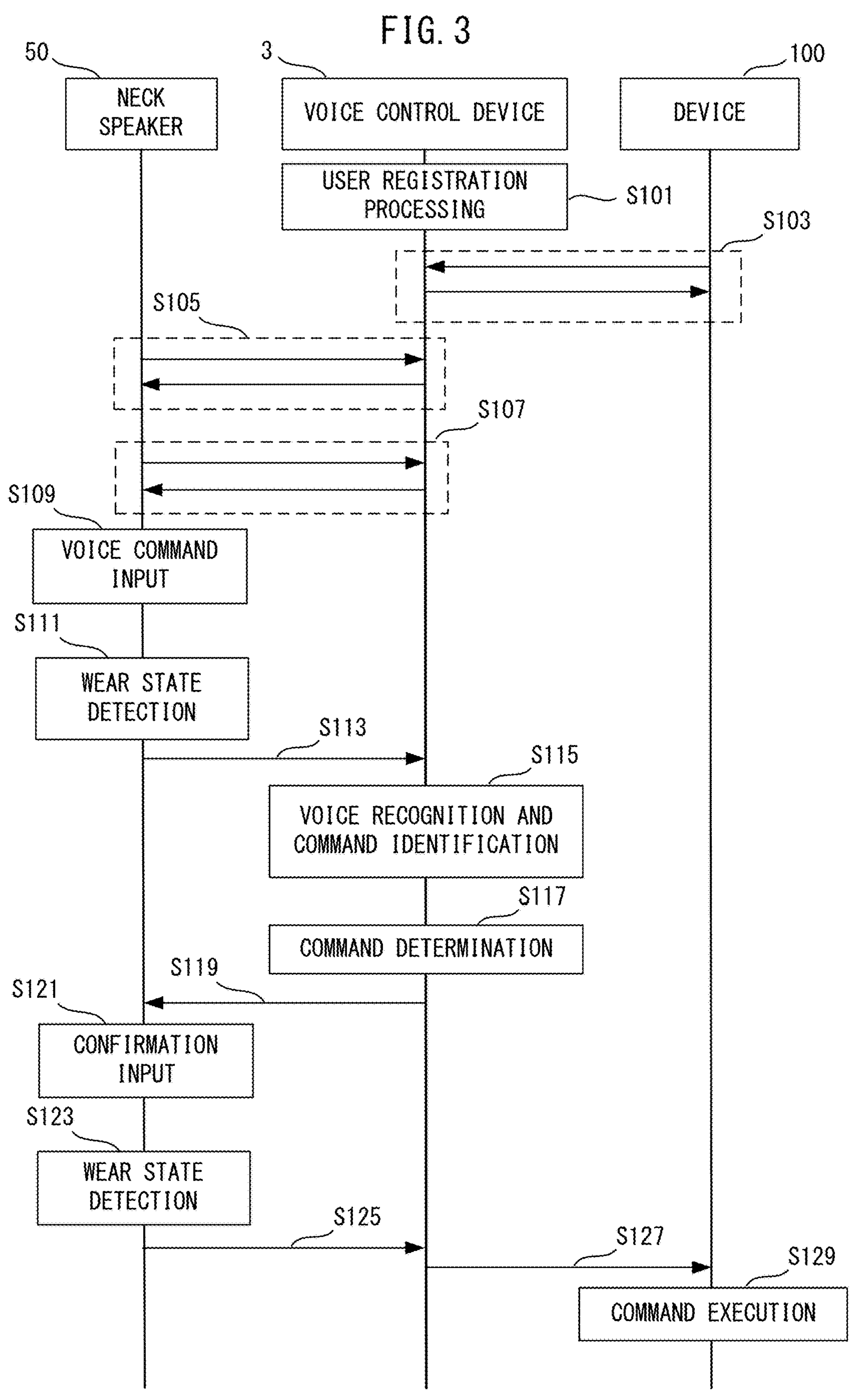
FIG. 3 is an explanatory diagram of an overview of processing performed by the power tool system as a whole.

As illustrated in FIG. 3, the voice data of the user 7 of the neck speaker 50 is registered in the voice control device 3 (S101, user registration processing). Specific information is transmitted and received between the voice control device 3 and the device 100, and between the voice control device 3 and the neck speaker 50, and pairing is thus performed (S103 and S105). Furthermore, specific information is transmitted and received between the neck speaker 50 and the voice control device 3, and user authentication processing is thus performed (S107) that verifies that the user 7 of the neck speaker 50 is a registered user who can operate the device 100 using the voice command.

The voice command uttered by the user 7 of the neck speaker 50 and relating to the operation of the device 100 is input to the neck speaker 50 (S109), and a wear state of the neck speaker 50 is detected (S111). The voice data and a detection result are transmitted to the voice control device 3 (S113). If the neck speaker 50 is being worn, the voice control device 3 performs the voice recognition based on the voice data acquired from the neck speaker 50, and identifies a command (S115). The voice control device 3 determines whether or not the identified command can be executed (S117). If it is determined that the command can be executed, the voice control device 3 issues a request to the neck speaker 50 to confirm whether execution of the command is permitted (S119).

Voice of the user 7 of the neck speaker 50 that confirms the command execution is input to the neck speaker 50 (S121), and the wear state of the neck speaker 50 is detected (S123). The voice data and the detection result are transmitted to the voice control device 3 (S125). If the neck speaker 50 is being worn, the voice control device 3 transmits, to the device 100, control information to cause the device 100 to execute the commanded operation (S127). The device 100 executes the commanded operation in accordance with the received control information (S129).

Subsequently, the processing from S109 to S129 is repeated as appropriate. Note that, in this example, only one of the devices 100 is illustrated, but if the pairing has been performed between the voice control device 3 and multiple devices 100, the user 7 of the neck speaker 50 can utter a voice command with respect to the devices 100 in a selective manner. The voice control device 3 transmits the control information to the appropriate device/devices 100 based on the voice data, and controls the operation of the device/devices 100.

Hereinafter, processing performed in each of the voice control device 3, the neck speaker 50, and the device 100 will be described in detail, in that order.

First, with reference to FIG. 4, the user registration processing performed by the controller 33 (more specifically, the CPU 331) in the voice control device 3 will be described. The user registration processing is started in response to the user registration button 315 being turned on. Further, this processing is realized by the CPU 331 reading out, to the RAM 333, a program stored in one of the ROM 332, the memory 334, and the storage portion 35 and executing the program.

As illustrated in FIG. 4, the CPU 331 first outputs voice from the speaker 37 that requests input of the passcode (S301). The CPU 331 acquires appropriate voice data from the storage portion 35 and uses the data to output the voice. The same applies to voice output processing to be described below.

By comparing the passcode that is input via the manipulation portion 316 with a passcode set in advance and stored in the storage portion 35, the CPU 331 determines whether or not the input passcode is correct (S302). If the passcode is not correct (no at S302), the CPU 331 outputs, from the speaker 37, voice that notifies an operator of the voice control device 3 that the passcode is incorrect and voice that requests the operator to try the registration again (S303, S316). Subsequently, the CPU 331 turns the power off (S319), and ends the user registration processing.

If the input passcode is correct (yes at S302), the CPU 331 outputs voice from the speaker 37 that requests the operator to utter an activation word (a wake word) (S305). A piece of voice data of voice input from the microphone 34 is acquired, and is temporarily stored in the RAM 333 (S306). If a number of the acquired pieces of voice data is less than three (no at S307), the CPU 331 returns the processing to S305 and prompts the utterance once more.

If the number of the acquired pieces of voice data reaches three (yes at S307), the CPU 331 outputs voice from the speaker 37 that requests a command as to whether or not to register the voice data (S311). Voice data of voice input from the microphone 34 is acquired (S312), and the CPU 331 converts the voice data into text data using voice recognition (S313). The CPU 331 then determines, based on the obtained text data, whether or not the registration has been commanded (S314).

In voice recognition processing at S313, any known method may be used. The present embodiment employs at least one voice recognition model that has been obtained by learning in advance a large amount of data using machine learning (deep learning using neural networks, for example). For example, an acoustic model and a language model may be employed and used separately in some of the steps of the voice recognition processing. Alternatively, a single model (an end-to-end model) may be employed and used in an integrated manner in the voice recognition processing. In the present embodiment, the machine learning for generating the at least one voice recognition model is performed in advance by an information processing device (not illustrated) that is discrete from the voice control device 3, and the generated voice recognition model is stored in the storage portion 35.

Further, in the present embodiment, the determination at S314 is performed by comparing the text data that is obtained by the voice recognition processing with text data that is stored in advance in the storage portion 35 in association with a registration command. Instead of this example, at S313 and S314, the command may be determined by analyzing the meaning of the input voice using a natural language processing technique, together with the voice recognition. The same applies to voice recognition and command identification (S474 to S475) in command identification processing (refer to FIG. 9) to be described later.

If the CPU 331 determines that the registration has been refused (no at S314), the CPU 331 outputs voice from the speaker 37 that requests the operator to try the registration again (S316). The CPU 331 then turns the power off (S319), and ends the user registration processing.

If the CPU 331 determines that the registration has been commanded (yes at S314), the CPU 331 generates a user ID, associates the user ID with the voice data (data of a speech waveform), and stores (registers) the associated user ID and the voice data in the storage portion 35 (S315). Hereinafter, a person whose voice data is stored in the storage portion 35 will be referred to as a registered user, and the stored voice data will be referred to as registered voice data. Note that the three acquired pieces of voice data may all be stored. Alternatively, one piece of data may be generated from the three pieces of voice data to represent characteristics of the speech waveform obtained when the registered user uttered the activation word, and the generated one piece of data may be stored. When the registration is complete, the CPU 331 outputs voice from the speaker 37 that reports that the registration is complete (S317), turns the power off (S319), and ends the user registration processing.

Next, main processing performed by the controller 33 (more specifically, the CPU 331) in the voice control device 3 will be described with reference to FIG. 5 to FIG. 12. The main processing is started in response to the power switch 313 being turned on, and ends in response to the power switch 313 being turned off during processing. Further, this processing is realized by the CPU 331 reading out and executing a program stored in one of the ROM 332, the memory 334, and the storage portion 35.

Figure 5:
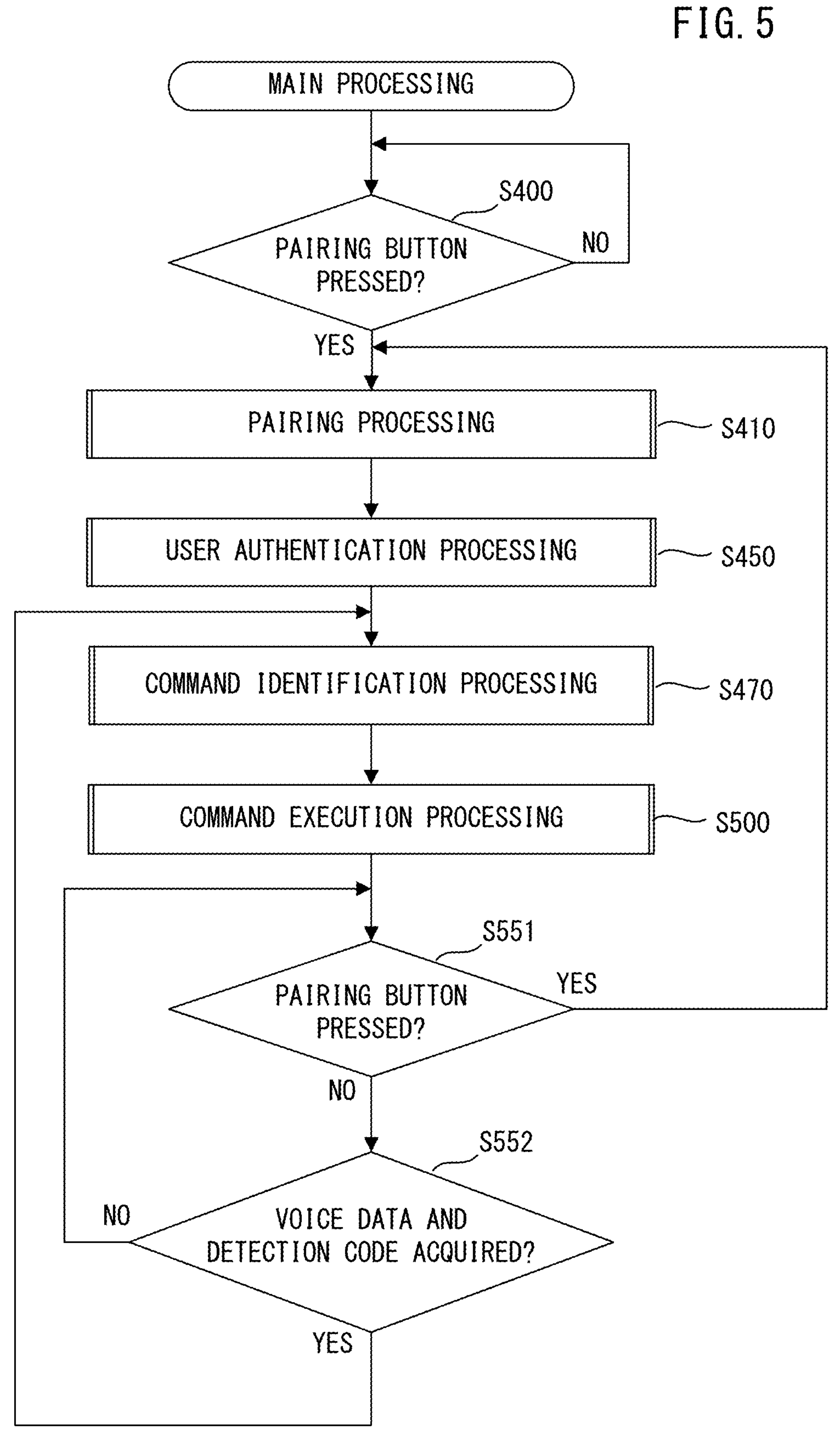
FIG. 5 is a flowchart of main processing performed by the voice control device.

As illustrated in FIG. 5, when the main processing is started, the CPU 331 stands by until the pairing button 314 is pressed (no at S400, S400). In response to the pairing button 314 being pressed (yes at S400), the CPU 331 performs pairing processing (S410). Hereinafter, the pairing processing will be described with reference to FIG. 6 and FIG. 7. As described above, "pairing" means registering setting information of a counterpart device, in order to establish a state in which wireless one-to-one communication is possible between two devices.

As illustrated in FIG. 6, the CPU 331 first determines whether or not the pairing button 314 has been pressed for longer than a predetermined time period namely, whether or not the pairing button 314 has been long pressed) (S411). In the present embodiment, the setting information of an external device that has been paired with the voice control device 3 in the past (hereinafter referred to as registered setting information) is stored in the storage portion 35. The long pressing is a command operation to newly register the setting information of the neck speaker 50 and/or the device/devices 100 that has/have not been paired in the past.

If the CPU 331 determines that the pairing button 314 has been long pressed (yes at S411), and then receives the setting information of the pairing counterpart (yes at S412), the CPU 331 registers the received setting information in the storage portion 35 (S413). The CPU 331 turns on the green LED of the reporting portion 317, and outputs voice from the speaker 37 reporting that the setting information has been registered (S414). The CPU 331 acquires setting information of the voice control device 3, and transmits the setting information to the pairing counterpart (S415). Note that the setting information of the voice control device 3 may be stored in the ROM 332, for example. The CPU 331 stands by until a registration complete signal is received from the pairing counterpart (no at S416, S416). In response to the registration complete signal being received (yes at S416), the CPU 331 turns off the green LED to report that the registration is complete (S417), and returns the processing to S412. The pairing processing up to this point enables the wireless one-to-one communication between the pairing counterpart and the voice control device 3.

If the pairing button 314 is once more pressed before receiving the setting information of the pairing counterpart, or after registering the setting information of the pairing counterpart (yes at S421), the CPU 331 recognizes that a command to end the pairing processing has been issued. The CPU 331 transmits, to the neck speaker 50, information (hereinafter referred to as connected device information) relating to the (currently connected) device 100 for which the wireless connection has been established by the pairing (S423). The CPU 331 ends the pairing processing, and returns the processing to the main processing (refer to FIG. 5). Note that in the voice control device 3, the connected device information may be stored as necessary in the RAM 333. The connected device information includes at least information (a device ID) indicating a type (name) of the device 100.

The CPU 331 monitors the reception of the setting information and the pressing once more of the pairing button 314 until a predetermined time period elapses (no at S425, S412, S421). If the predetermined time period elapses without the pairing button 314 being pressed once more (yes at S425), the CPU 331 causes the red LED of the reporting portion 317 to flash and outputs voice from the speaker 37 that reports the end of the pairing processing (S426). The CPU 331 shifts the processing to S423, ends the pairing processing, and returns the processing to the main processing (refer to FIG. 5).

Figure 7:
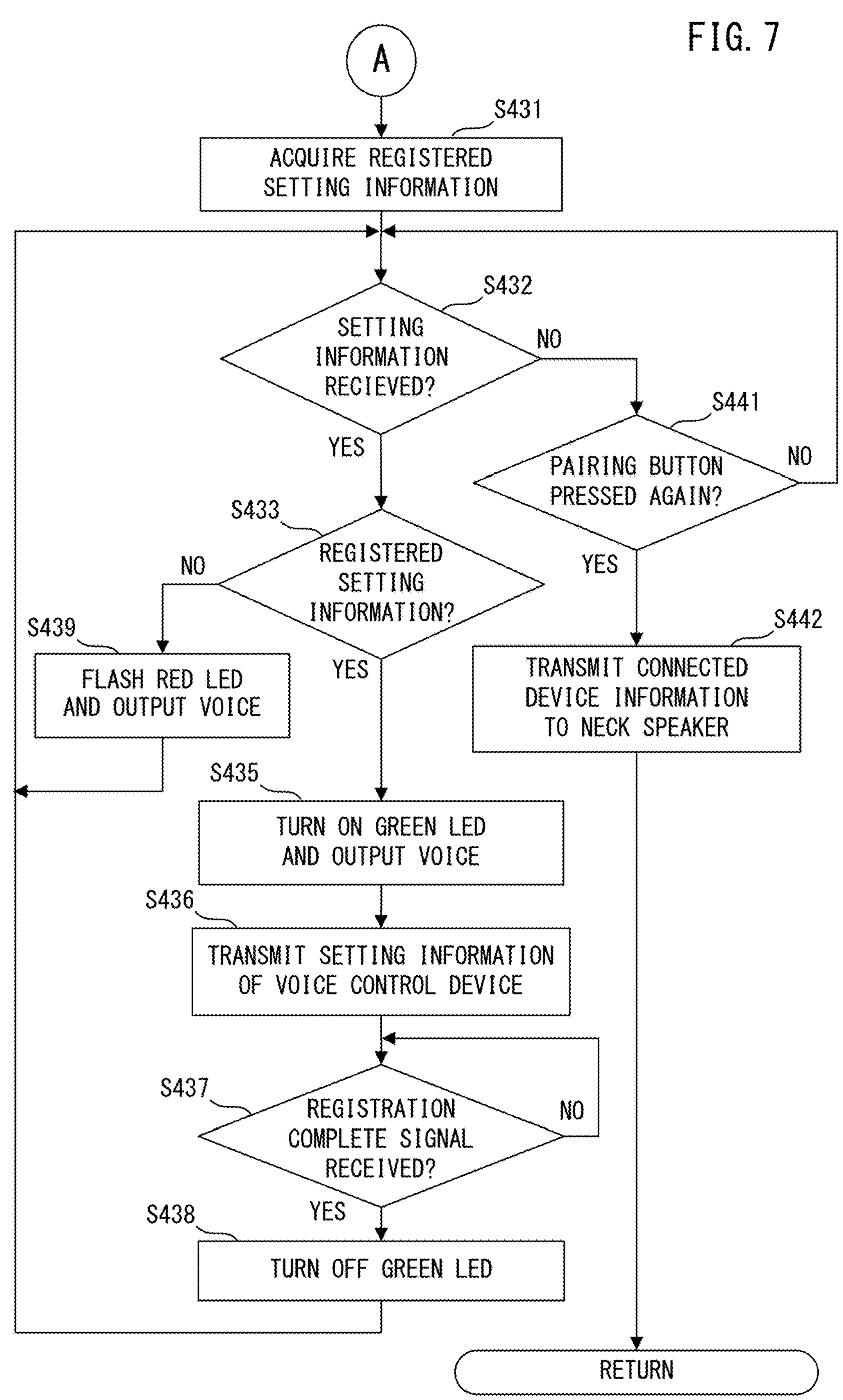
FIG. 7 is a flowchart of the pairing processing, and is a continuation of FIG. 6.

If the pairing button 314 has not been long pressed (no at S411), as illustrated in FIG. 7, the CPU 331 acquires the registered setting information stored in the storage portion 35 (S431). If the setting information of the pairing counterpart is received (yes at S432), the CPU 331 determines whether or not the setting information of the pairing counterpart is registered in the storage portion 35 (namely, determines whether or not the setting information of the pairing counterpart is included in the registered setting information) (S433). If the setting information of the pairing counterpart is not registered (no at S433), the CPU 331 flashes the red LED of the reporting portion 317, outputs voice from the speaker 37 reporting that the pairing counterpart is not registered in the storage portion 35 (S439), and returns the processing to S432.

On the other hand, if the setting information of the pairing counterpart is registered (yes at S433), the CPU 331 turns on the green LED of the reporting portion 317, and outputs voice from the speaker 37 reporting that the pairing counterpart is registered in the storage portion 35 (S435). The CPU 331 acquires the setting information of the voice control device 3, and transmits the acquired setting information to the pairing counterpart (S436). The CPU 331 stands by until a registration complete signal is received from the pairing counterpart (no at S437, S437). When the registration complete signal is received (yes at S437), the CPU 331 turns off the green LED to report that the registration is complete (S438), and returns the processing to S432.

During a period in which the pairing button 314 is not pressed once more (no at S441), the CPU 331 performs the above-described processing from S433 to S439 each time the setting information of the pairing counterpart is received. Thus, during this period, the voice control device 3 can establish the wireless connection with multiple external devices (with the neck speaker 50 and the devices 100, for example). In response to the pairing button 314 being pressed once more (yes at S441), the CPU 331 transmits the connected device information to the neck speaker 50 (S442), ends the pairing processing, and returns the processing to the main processing (refer to FIG. 5). Note that the CPU 331 may end the pairing processing and return the processing to the main processing if a predetermined time period elapses without the pairing button 314 being pressed once more.

As illustrated in FIG. 5, in the main processing, after the pairing processing (S410), user authentication processing (S450) is performed. The user authentication processing is processing for confirming whether or not the user 7 of the neck speaker 50 issuing the voice command is the registered user. Hereinafter, the user authentication processing will be described with reference to FIG. 8.

Figure 8:
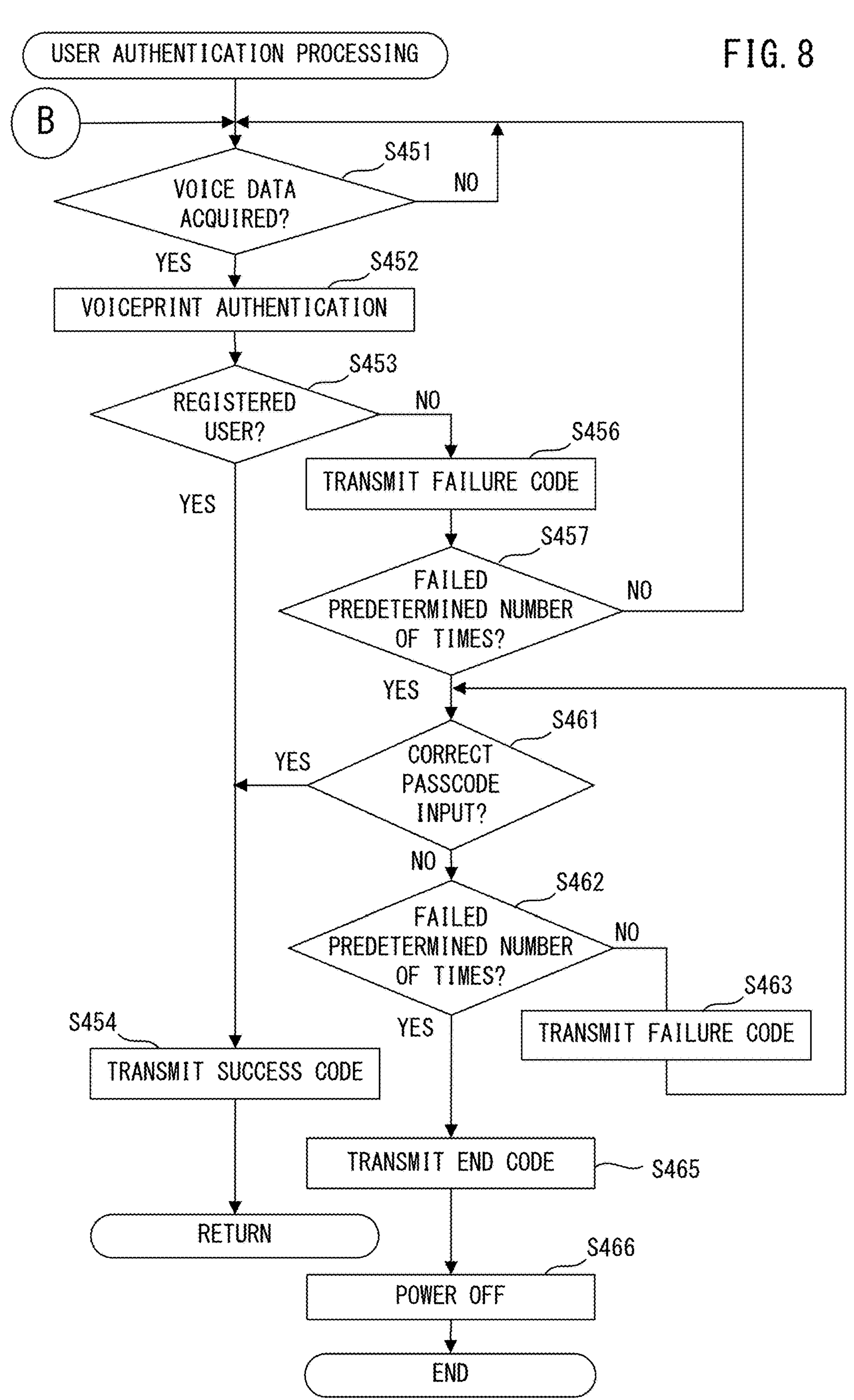
FIG. 8 is a flowchart of user authentication processing performed in the main processing.

As illustrated in FIG. 8, the CPU 331 first stands by until voice data transmitted from the neck speaker 50 and received by the communication portion 38 is acquired (no at S451, S451). When the voice data is acquired (yes at S451), the CPU 331 performs voiceprint authentication using the registered voice data stored in the storage portion 35 (S452). Note that the voiceprint authentication may be performed using any known method. If the CPU 331 determines, as a result of the voiceprint authentication, that the user 7 of the neck speaker 50 is the registered user (yes at S453), the CPU 331 transmits a success code to the neck speaker 50 (S454). The CPU 331 then ends the user authentication processing, and returns the processing to the main processing (refer to FIG. 5).

If the CPU 331 determines, as a result of the voiceprint authentication, that the user 7 of the neck speaker 50 is not the registered user (no at S453), the CPU 331 transmits a failure code to the neck speaker 50 (S456). If a number of failures of the voiceprint authentication has not reached a predetermined number of times (no at S457), the CPU 331 returns the processing to S451 and stands by to acquire voice data.

If the number of failures of the voiceprint authentication reaches the predetermined number of times (yes at S457), the CPU 331 determines whether or not the correct passcode has been input via the manipulation portion 316 (S461). Note that, as will be described in detail later, if the number of failures of the voiceprint authentication reaches the predetermined number of times, the speakers 53 of the neck speaker 50 output voice that requests the input of the passcode. This is because, when only the voiceprint authentication is used, there is a possibility of mistakenly determining that the user 7 is not the registered user, due to ambient noise or the like.

If the incorrect passcode is input (no at S461), and if a number of failures of the passcode input has not reached a predetermined number of times (no at S462), the CPU 331 transmits a failure code to the neck speaker 50 (S463), returns the processing to S461, and stands by for the input of the passcode. If the number of failures reaches the predetermined number of times (yes at S462), the CPU 331 transmits an end code to the neck speaker 50 (S465), turns the power off (S466), and ends the main processing, in order to prevent the device 100 from being controlled by a voice command from a person who is not authorized as the registered user.

As a result of the above-described user authentication processing, for example, by giving the passcode only to a person satisfying a predetermined condition (a skilled operator, a worksite supervisor, for example) to allow the person to be the registered user, and, by further performing the voiceprint authentication, it is possible to reduce the possibility of an inappropriate voice command being executed.

As illustrated in FIG. 5, in the main processing, after the user authentication processing (S450) is ended by the transmission of the success code (S454), command identification processing (S470) is performed. In the command identification processing, voice recognition is performed to identify content of a voice command. Hereinafter, the command identification processing will be described with reference to FIG. 9.

Figure 9:
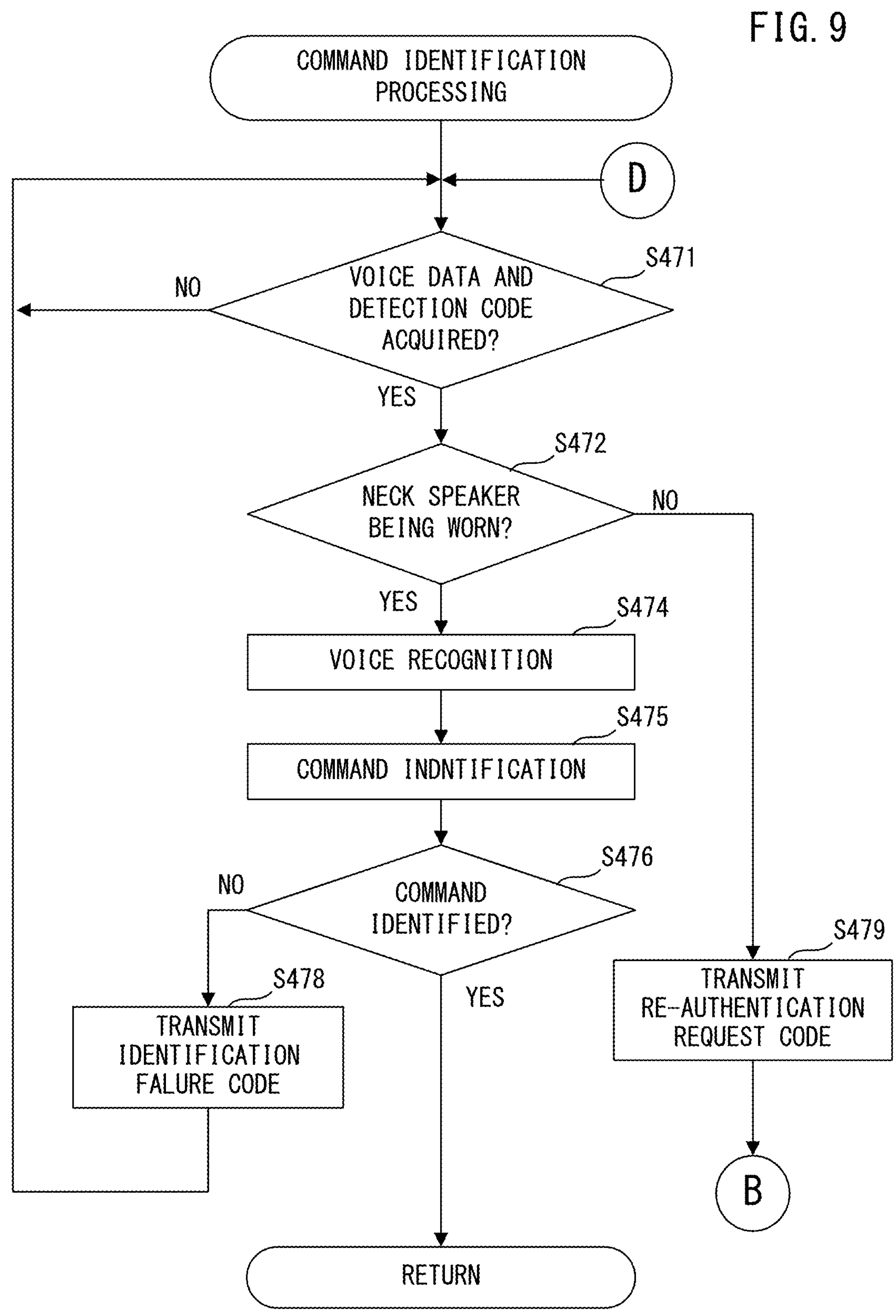
FIG. 9 is a flowchart of command identification processing performed in the main processing.

As illustrated in FIG. 9, the CPU 331 first stands by until the CPU 331 acquires voice data and a detection code transmitted from the neck speaker 50 and received by the communication portion 38 (no at S471, S471). Note that the detection code is a signal that indicates a detection result of the wear detection portion 55 of the neck speaker 50, and indicates whether or not the neck speaker 50 is being worn. If the voice data and the detection code are acquired (yes at S471), the CPU 331 determines, based on the detection code, whether or not the neck speaker 50 is being worn (S472).

If it is determined that the neck speaker 50 is not being worn, this means that the person who was authorized as the registered user by the voiceprint authentication has removed the neck speaker 50. If it is determined that the neck speaker 50 is not being worn (no at S472), the CPU 331 transmits a re-authentication request code to the neck speaker 50 (S479), and returns the processing to S451 of the user authentication processing (refer to FIG. 8). Such processing can reduce the possibility of an inappropriate voice command being issued by a different person after the person who was authorized as the registered user by the voiceprint authentication has removed the neck speaker 50.

If it is determined that the neck speaker 50 is being worn (yes at S472), the CPU 331 performs the voice recognition (S474), and identifies the command (S475). The voice recognition performed at S474 is substantially the same as the voice recognition performed in the user registration processing (S313 in FIG. 4), and at least one voice recognition model is used. Further, in the present embodiment, the identification of the command at S475 is performed by comparing text data obtained by the voice recognition processing with pieces of text data stored in advance in association with a variety of commands in the storage portion 35.

Here, with reference to FIG. 10, examples will be described of information (hereinafter referred to as command identification information) stored in the storage portion 35 for the identification of the command in the present embodiment. As illustrated in FIG. 10, each piece of the command identification information includes, for example, at least one piece of command text data, a command ID, a limitation discrimination code, at least one piece of device text data, and at least one device ID that are mutually associated with each other. Each piece of the command text data is text data of a command relating to the operation of the device 100 that can execute the command. The command ID is information for identifying the command. The limitation discrimination code is information indicating whether or not there is a limitation on the execution of the command (namely, whether or not the command is allowed to be executed without limitation). Specifically, "0" is assigned when there is no limitation, and "1" is assigned when there is a limitation. Each piece of the device text data is text data that indicates a type (name) of the device 100 that can respond to the command. The device ID is information for identifying the type of the device.

In the example illustrated in FIG. 10, text data of "Set rotation speed to N" is associated with (i) a command ID "0001" indicating that the command relates to control of a rotation speed, (ii) the limitation discrimination code "1" indicating that there is a limitation, (iii) text data of "Grinder" and "Polisher" indicating the types of the devices 100 that can respond to the command, and (iv) device codes "102" and "108" corresponding to these types of devices 100. Further, text data of "Increase brightness of light" and "Turn on light only" is associated with (i) a command ID "0002" indicating that the command relates to control of the light amount, (ii) the limitation discrimination code "0" indicating that there is no limitation, (iii) text data of "Illumination device", "Impact driver" and other power tools indicating the types of the devices 100 with the LED light 115 that can respond to the command, and (iv) device codes "103," "101," and the like corresponding to these types of devices 100. In a similar manner, information for executing commands is associated with the command text data corresponding to various commands.

If at least some of the text data obtained by the voice recognition substantially includes the command text data, the CPU 331 identifies the command ID associated with that command text data. Further, when at least some of the text data obtained by the voice recognition substantially includes the device text data, the CPU 331 identifies the device ID associated with that device text data.

As illustrated in FIG. 9, the CPU 331 determines whether or not the command has been successfully identified, based on whether or not the text data has been obtained by the voice recognition (S476). More specifically, if the voice recognition has been successful (yes at S476), the CPU 331 ends the command identification processing and returns the processing to the main processing (refer to FIG. 5). On the other hand, if the voice recognition has failed (no at S476), the CPU 331 transmits an identification failure code to the neck speaker 50 (S478), returns the processing to S471, and stands by to acquire voice data.

As illustrated in FIG. 5, in the main processing, after the command identification processing (S470), command execution processing (S500) is performed. The command execution processing is processing for causing the device 100 to operate in accordance with the command. Hereinafter, the command execution processing will be described with reference to FIG. 11 and FIG. 12.

As illustrated in FIG. 11, the CPU 331 first determines whether or not the command is executable (S501). More specifically, (i) if the CPU 331 failed to identify either one or both of the command ID and the device ID at S475 of the command identification processing, (ii) if the identified command ID and device ID are not associated with each other, or (iii) if the identified device ID is not included in the connected device information, the CPU 331 determines that the command cannot be executed (no at S501). In such a case, the CPU 331 transmits an execution impossible code to the neck speaker 50 (S511), returns the processing to S471 of the command identification processing (refer to FIG. 9), and stands by to acquire voice data of a command once more.

If, at S475 of the command identification processing, the command ID and the device ID that are associated with each other are identified, and the identified device ID is included in the connected device information, the CPU 331 determines that the command can be executed (yes at S501). In this case, the CPU 331 transmits the command ID and the limitation discrimination code to the device 100 that is to execute the command (S502). If the CPU 331 does not receive a confirmation code from the device 100 within a predetermined time period (no at S505), the CPU 331 determines that command execution has failed. The CPU 331 transmits an execution failure code to the neck speaker 50 (S512), returns the processing to S471 of the command identification processing, and stands by for voice data of a new command.

If the CPU 331 receives the confirmation code from the device 100 within the predetermined time period (yes at S505), the CPU 331 transmits, to the neck speaker 50, a confirmation request code for prompting final confirmation (S506). If the voice data and the detection code from the neck speaker 50 cannot be acquired within a predetermined time period (no at S507), the CPU 331 transmits the execution failure code to the neck speaker 50 (S512), returns the processing to S471 of the command identification processing, and stands by to acquire voice data of a command once more. If the voice data and the detection code from the neck speaker 50 are acquired within the predetermined time period (yes at S507), the CPU 331 determines, based on the detection code, whether or not the neck speaker 50 is being worn (S508). If the neck speaker 50 is not being worn (no at S508), the CPU 331 transmits the re-authentication request code to the neck speaker 50 (S513), and returns the processing to S451 of the user authentication processing (refer to FIG. 8).

If it is determined that the neck speaker 50 is being worn (yes at S508), as illustrated in FIG. 12, the CPU 331 performs voice recognition (S515), and identifies the command (S516). The processing at S515 and S516 is the same as the processing at S312 and S313 of the above-described user registration processing. The CPU 331 determines whether or not the identified command is an execution command (S517).

If the identified command is a command requesting that execution be stopped (no at S517), the CPU 331 transmits a cancellation code to the neck speaker 50 and to the device 100 (S518, S519), returns the processing to S471 of the command identification processing, and stands by to acquire voice data of a new command.

If the identified command is the execution command (yes at S517), the CPU 331 transmits an execution confirmation code to the device 100 that is to execute the command (S521). The CPU 331 monitors a signal transmitted from the device 100 until a predetermined time period has elapsed (no at S522, no at S523, no at S524). If the predetermined time period elapses without receiving the signal from the device 100 (yes at S522), the CPU 331 transmits the execution failure code to the neck speaker 50 (S527), returns the processing to S471 of the command identification processing, and stands by to acquire voice data of a new command.

If, the CPU 331 acquires a stand-by code transmitted from the device 100 and received by the communication portion 38 within the predetermined time period (no at S522, yes at S523) and a predetermined time period elapses without receiving an execution complete code thereafter (no at S524, yes at S522), the CPU 331 transmits the execution failure code to the neck speaker 50 (S527), returns the processing to S471 of the command identification processing, and stands by for voice data of a new command. Note that, as will be described in detail below, the stand-by code is a signal that is transmitted from the device 100 to the voice control device 3 when an operation having a limitation on the execution has been commanded to the device 100, in order to notify the voice control device 3 that the device 100 will stand by until the limitation is resolved or eliminated.

If the CPU 331 acquires the execution complete code transmitted from the device 100 and received by the communication portion 38 within the predetermined time period (no at S522, no at S523, yes at S524), the CPU 331 transmits the execution complete code to the neck speaker 50 (S525), ends the command execution processing, and returns the processing to the main processing.

As illustrated in FIG. 5, in the main processing, after the command execution processing (S500), the CPU 331 stands by until the pairing button 314 is pressed, or the CPU 331 acquires the voice data and the detection code (no at S551, no at S552). If the pairing button 314 is pressed (yes at S551), the CPU 331 shifts the processing to the pairing processing (S410). If the CPU 331 acquires the voice data and detection code (yes at S552), the CPU 331 shifts the processing to the command identification processing (S470).

Hereinafter, main processing performed by the controller 56 (more specifically, the CPU 561) of the neck speaker 50 will be described with reference to FIG. 13 to FIG. 16. The main processing is started in response to the power switch 501 being turned on, and ends in response to the power switch 501 being turned off during processing. Further, this processing is realized by the CPU 561 reading out and executing a program stored in the ROM 562 or the memory 564.

Figure 13:
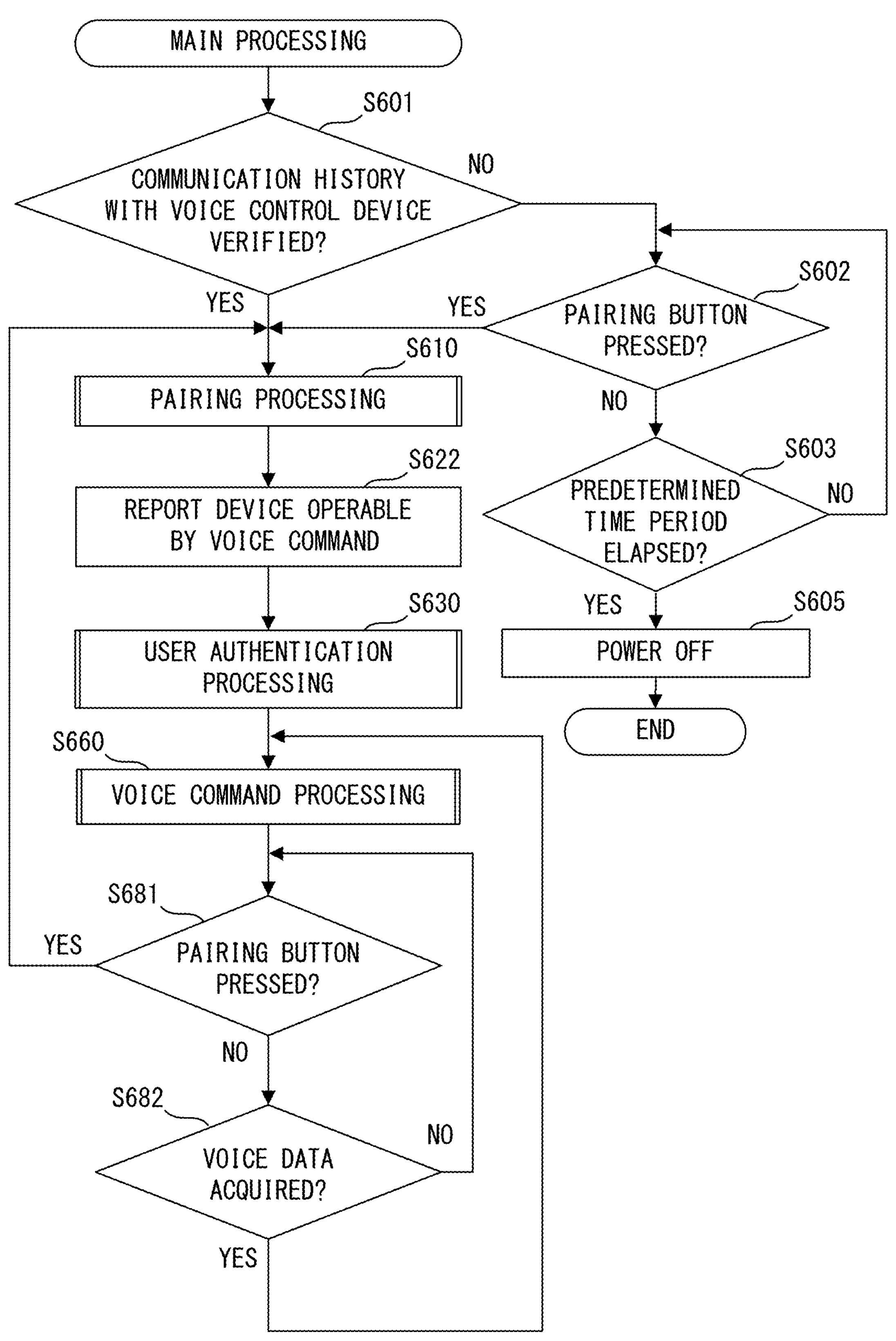
FIG. 13 is a flowchart of main processing performed by a neck speaker.

As illustrated in FIG. 13, the CPU 561 first verifies whether or not there is a communication history with the voice control device 3 in the neck speaker 50 (S601). Note that the communication history with the voice control device 3 is stored in the memory 564, for example. If there is no communication history with the voice control device 3, the CPU 561 stands by until the pairing button 502 is pressed (no at S601, S602). If a predetermined time period elapses without the pairing button 502 being pressed (no at S602, yes at S603), the CPU 561 turns the power off (S605), and ends the main processing.

If the communication history with the voice control device 3 has been verified (yes at S601), or if the pairing button 502 has been pressed within the predetermined time period (no at S603, yes at S602), the CPU 561 performs pairing processing (S610). Note that in the present embodiment, the pairing processing is started even without the pairing button 502 being pressed if there is the communication history with the voice control device 3. Such processing improves convenience. On the other hand, in the above-described voice control device 3, the pairing processing is not performed unless the pairing button 314 is pressed each time the power is turned on. This is to avoid unintentional connection, taking into account that various types of external devices can be connected to the voice control device 3.

Figure 14:
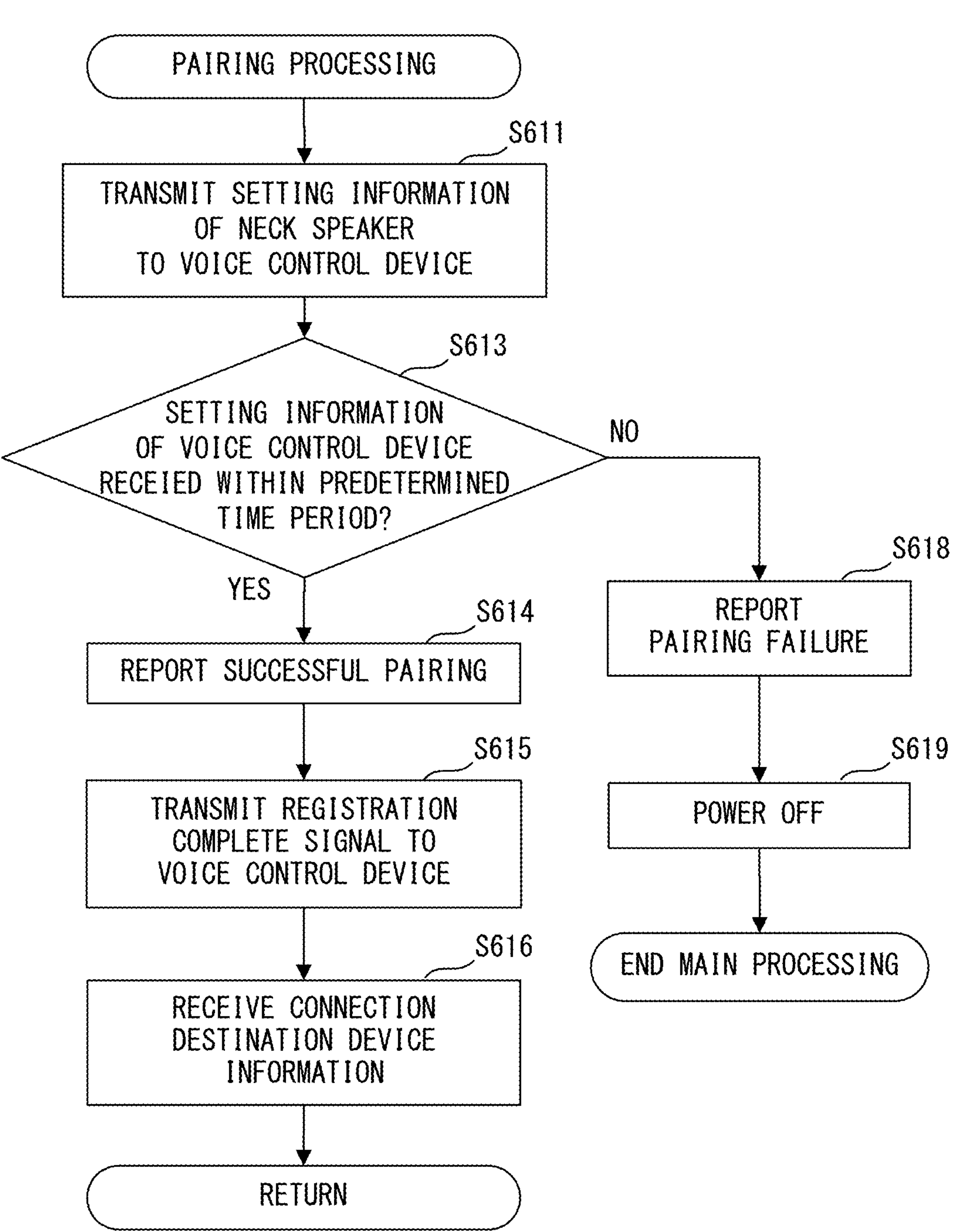
FIG. 14 is a flowchart of pairing processing performed in the main processing.

As illustrated in FIG. 14, in the pairing processing, the CPU 561 first acquires setting information of the neck speaker 50, and transmits the setting information to the voice control device 3 (S611). The setting information of the neck speaker 50 may be stored in the ROM 562, for example. If the CPU 561 cannot receive the setting information of the voice control device 3 within a predetermined time period (no at S613), the CPU 561 outputs voice from the speakers 53 that reports that the processing is to be ended due to a pairing failure (S618). Note that information for outputting the voice for providing information from the speakers 53 may be stored in the ROM 562 or the memory 564, for example. The CPU 561 turns the power off (S619), and ends the main processing.

If the setting information of the voice control device 3 is received within the predetermined time period (yes at S613), the CPU 561 outputs voice from the speakers 53 reporting that the pairing has been successful (S614). Note that the acquired setting information is stored in the RAM 563. The CPU 561 transmits the registration complete signal to the voice control device 3 (S615). Subsequently, the CPU 561 receives connection destination device information that is transmitted from the voice control device 3 in response to reception of the registration complete signal. The CPU 561 stores the connection destination device information in the RAM 563 (S616), and returns the processing to the main processing (refer to FIG. 13).

As illustrated in FIG. 13, after the pairing processing (S610), based on the connection destination device information, the CPU 561 outputs voice that reports the type/types of the device/devices 100 that can be operated by the voice command of the user 7 of the neck speaker 50 (S622). Subsequently, the user authentication processing (S630) is performed. The user authentication processing is processing for causing the voice control device 3 to verify, via communication with the voice control device 3, whether or not the user 7 of the neck speaker 50 is the registered user. Hereinafter, the user authentication processing will be described with reference to FIG. 15.

As illustrated in FIG. 15, in the user authentication processing, the CPU 561 outputs voice that requests utterance of an activation word (S631), and stands until the CPU 561 acquires voice data generated by the microphone 52 (no at S632, S632). When the voice data is acquired (yes at S632), the CPU 561 transmits the voice data to the voice control device 3 via the communication portion 58 (S633).

As described above, if the success code is transmitted as a result of the voiceprint authentication being performed in the user authentication processing of the voice control device 3 (refer to FIG. 8), the CPU 561 acquires the success code via the communication portion 58, and determines that the authentication has been successful (yes at S635). In this case, the CPU 561 causes the green LED of the reporting portion 516 to flash, and outputs voice from the speakers 53 that reports the successful authentication (S636). The CPU 561 turns on the green LED after a predetermined time period has elapsed to report that the neck speaker 50 is in a stand-by state (S637), and returns the processing to the main processing (refer to FIG. 13).

If a failure code transmitted from the voice control device 3 is acquired (no at S635), and if a number of times that the CPU 561 acquired the failure code has not reached a predetermined number of times (no at S641), the CPU 561 outputs voice from the speakers 53 that requests the user 7 to utter the activation word once again (S642). The CPU 561 then returns the processing to S632, and stands by to acquire voice data. If the number of times that the CPU 561 acquired the failure code has reached the predetermined number of times (yes at S641), the CPU 561 outputs voice from the speakers 53 that requests the user 7 to input the passcode on the voice control device 3 (S643).

If the success code is transmitted as a result of confirming the input passcode in the user authentication processing of the voice control device 3 (refer to FIG. 8), the CPU 561 acquires the success code via the communication portion 58, and determines that the authentication has been successful (yes at S645). The CPU 561 performs the processing at S636 and S637 as described above, and returns the processing to the main processing (refer to FIG. 13).

If the failure code transmitted from the voice control device 3 has been acquired (no at S645), the CPU 561 determines whether or not a number of times that the CPU 561 acquired the failure code after S643 has reached a predetermined number of times (S646). If the number of failures has not reached the predetermined number of times (no at S646), the CPU 561 outputs voice from the speakers 53 that requests the user 7 to input the passcode once more on the voice control device 3 (S647), returns the processing to S645, and stands by for the authentication result. If the number of failures reaches the predetermined number of times (yes at S646), the CPU 561 outputs voice from the speakers 53 that reports that the processing will be terminated due to failure of the authentication (S648). The CPU 561 turns the power off (S649), and ends the main processing.

As illustrated in FIG. 13, after the user authentication processing (S630), voice command processing (S660) is performed. The voice command processing is processing for causing the voice control device 3, via communication with the voice control device 3, to control the operation of the device 100 using the voice command of the user 7 of the neck speaker 50. Hereinafter, the voice command processing will be described with reference to FIG. 16

Figure 16:
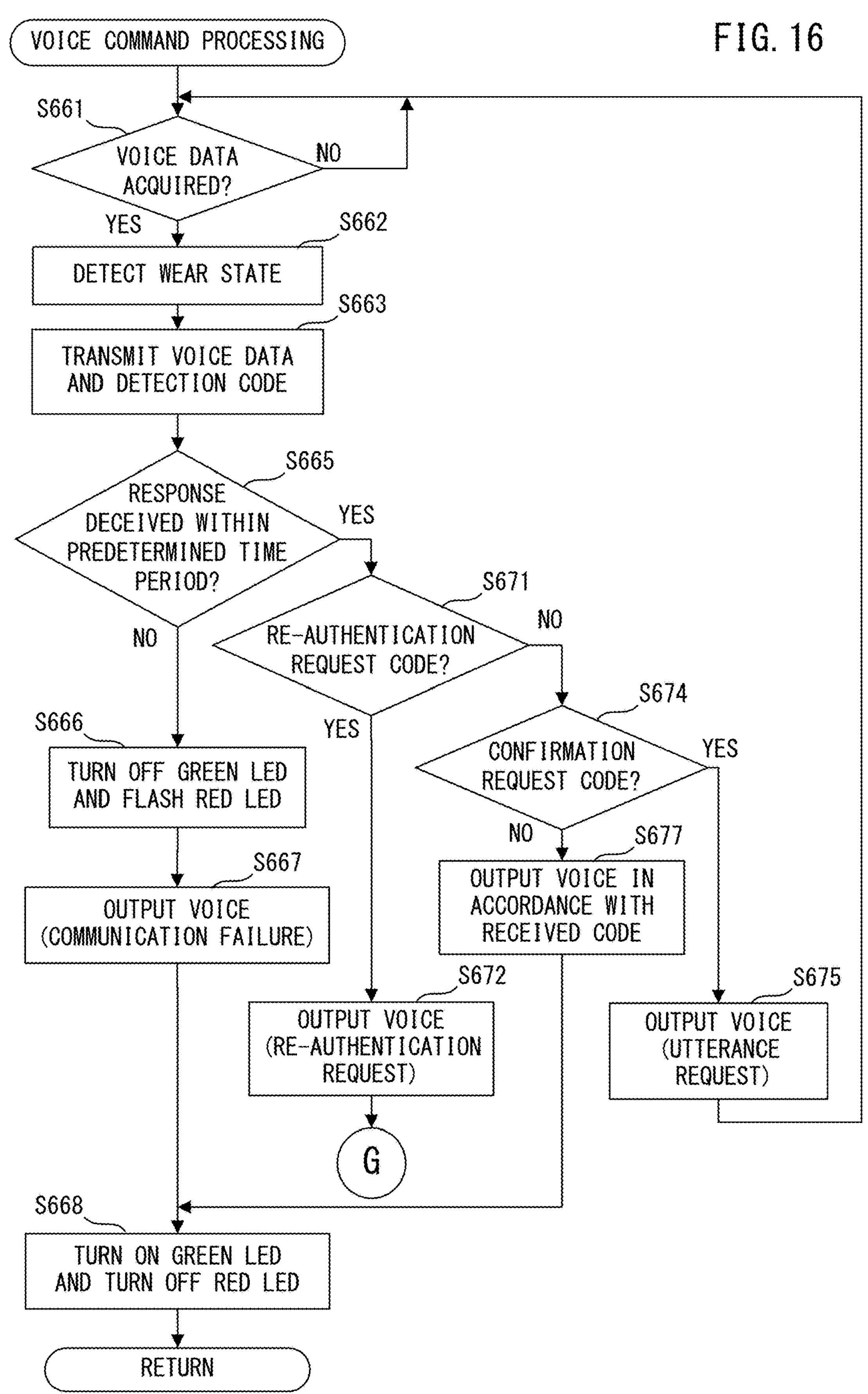
FIG. 16 is a flowchart of voice command processing performed in the main processing.

As illustrated in FIG. 16, the CPU 561 stands by until voice data generated by the microphone 52 is acquired (no at S661, S661). When the voice data is acquired (yes at S661), the CPU 561 acquires a detection result of the wear detection portion 55 (S662), and transmits, to the voice control device 3 via the communication portion 58, the voice data and the detection code indicating the detection result (S663).

If there is no response from the voice control device 3 within a predetermined time period (no at S665), the CPU 561 turns off the green LED of the reporting portion 516, causes the red LED to flash (S666), and outputs voice from the speakers 53 notifying the user 7 that the communication has failed (S667). Subsequently, the CPU 561 turns on the green LED and turns off the red LED to report that the neck speaker 50 is back to the stand-by state (S668), and returns the processing to the main processing (refer to FIG. 13).

As described above, in the command identification processing (refer to FIG. 9) or the command execution processing (refer to FIG. 11 and FIG. 12) of the voice control device 3, if it is determined, based on the detection code, that the neck speaker 50 is not being worn, the re-authentication request code is transmitted to the neck speaker 50. If the CPU 561 acquires the re-authentication request code via the communication portion 58 within the predetermined time period (yes at S665, yes at S671), the CPU 561 outputs voice from the speakers 53 that requests the user 7 to go through the user authentication processing once more (S672), and returns the processing to S631 of the user authentication processing (refer to FIG. 15).

Further, as described above, in the command execution processing (refer to FIG. 11) of the voice control device 3, if it is determined that the command can be executed, the confirmation request code for the final confirmation is transmitted to the neck speaker 50. If the confirmation request code is acquired via the communication portion 58 within the predetermined time period (yes at S665, no at S671, yes at S674), the CPU 561 outputs voice from the speakers 53 that requests the user 7 to report, by utterance, whether or not the user 7 permits the execution of the command (S675), returns the processing to S661, and stands by to acquire voice data.

Furthermore, in the command identification processing (refer to FIG. 9), or the command execution processing (refer to FIG. 11 and FIG. 12) of the voice control device 3, various other codes may be transmitted to the neck speaker 50. If a code other than the re-authentication request code and the re-authentication request code is acquired via the communication portion 58 within the predetermined time period (yes at S665, no at S671, no at S674), the CPU 561 outputs voice from the speakers 53 in accordance with the received code (S677).

Specifically, if the identification failure code transmitted from the voice control device 3 is acquired, the CPU 561 outputs the voice from the speakers 53 reporting that the voice recognition of the command has failed. Further, if the execution impossible code transmitted from the voice control device 3 is acquired, the CPU 561 outputs the voice from the speakers 53 reporting that the command cannot be executed. If the execution failure code transmitted from the voice control device 3 is acquired, the CPU 561 outputs the voice from the speakers 53 reporting that the execution of the command by the device 100 has failed. If the cancellation code transmitted from the voice control device 3 is acquired, the CPU 561 outputs the voice from the speakers 53 reporting that the command has been cancelled. Note that, in these cases, in the same manner as at S666, in conjunction with the voice output, the CPU 561 may turn off the green LED of the reporting portion 516 and cause the red LED to flash. Furthermore, if the execution complete code transmitted from the voice control device 3 is acquired, the CPU 561 outputs the voice from the speakers 53 reporting that the execution of the command is complete.

After outputting the voice in accordance with the code received at S677, the CPU 561 turns on the green LED and turns off the red LED to report that the neck speaker 50 is back to the stand-by state (S668), and returns the processing to the main processing (refer to FIG. 13).

As illustrated in FIG. 13, in the main processing, after the voice command processing (S660), the CPU 561 stands by until the pairing button 502 is pressed, or the CPU 561 acquires the voice data (no at S681, no at S682). If the pairing button 502 is pressed (yes at S681), the CPU 561 shifts the processing to the pairing processing (S610). If the voice data is acquired (yes at S682), the CPU 561 shifts the processing to the voice command processing (S660).

Hereinafter, voice control processing performed by the controller 16 (more specifically the CPU 161) in the device 100 will be described with reference to FIG. 17. The voice control processing is started in response to the pairing button 118 being pressed and being turned on. The voice control processing is realized by the CPU 161 reading out and executing a program from the ROM 162 or the memory 164.

Figure 17:
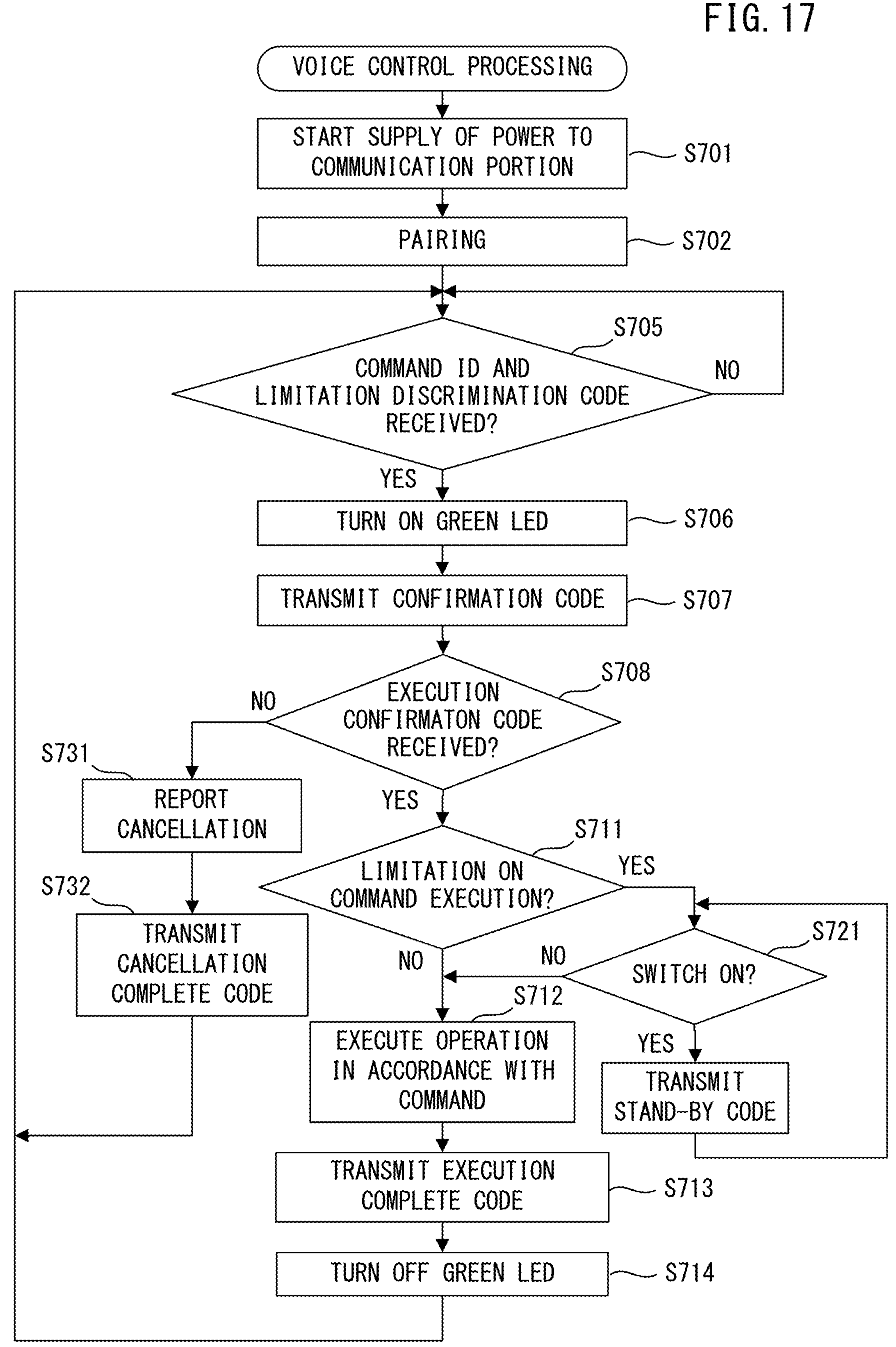
FIG. 17 is a flowchart of voice control processing performed by a device.

As illustrated in FIG. 17, in the voice control processing, the CPU 161 starts the supply of power to the communication portion 18 (S701). Subsequently, the CPU 161 performs pairing processing (S702). Note that the pairing processing performed in the device 100 is substantially the same as the pairing processing performed in the neck speaker 50 as described above (refer to FIG. 14), except that the connection destination device information is not received from the voice control device 3. A description thereof is thus omitted here.

After the wireless connection is established with the voice control device 3 by the pairing processing, the CPU 161 stands by to acquire the command ID and the limitation discrimination code (no at S705, S705). As described above, in the command execution processing (refer to FIG. 11) of the voice control device 3, if it is determined that the command given by the user 7 of the neck speaker 50 can be executed on the device 100, the command ID and the limitation discrimination code are transmitted to the device 100. When the command ID and the limitation discrimination code received from the voice control device 3 are acquired via the communication portion 18 (yes at S705), the CPU 161 turns on the green LED of the reporting portion 117 to report that the command from the voice control device 3 has been received (S706). The CPU 161 transmits the confirmation code to the voice control device 3 via the communication portion 18 (S707).

As described above, in the voice control device 3, in the command execution processing (refer to FIG. 11), the final confirmation as to whether or not to execute the command is made by the user 7 of the neck speaker 50, and a code indicating the result thereof is transmitted to the device 100. If the cancellation code transmitted from the voice control device 3 is acquired via the communication portion 18 (no at S708), the CPU 161 turns on the red LED of the reporting portion 117 to report that the command has been cancelled (S731). The CPU 161 transmits a cancellation complete code to the voice control device 3 via the communication portion 18 (S732), returns the processing to S705, and stands by to acquire the command ID and limitation discrimination code. On the other hand, if the execution confirmation code transmitted from the voice control device 3 is acquired via the communication portion 18 (yes at S708), the CPU 161 determines, based on the limitation discrimination code acquired at S705, whether or not there is the limitation on the execution of the command (S711).

Here, a specific example of the limitation on the execution of the command will be described. For example, if the device 100 is the impact driver 101, as illustrated in FIG. 10, the CPU 161 may receive the command ID "0002" relating to the control of the light amount and the command ID "0003" relating to the change in mode. The limitation discrimination code corresponding to the command ID "0002" is "0", which indicates a command having no limitation. The limitation discrimination code corresponding to the command ID "0003" is "1", which indicates a command having a limitation. The limitation discrimination code "1" is assigned to the command for which immediate execution of the commanded operation may be unfavorable.

For example, some operations, such as the change of the light amount described above (an increase in the light amount, for example), have a low possibility of having a negative impact on an inexperienced operator, even if the operations are performed while the inexperienced operator is using the device 100. For that reason, the limitation discrimination code "0" is assigned to such operations, so that the immediate execution of the command is allowed. Thus, if the limitation discrimination code is "0" (no at S711), the CPU 161 executes the operation in accordance with the command (increases the light amount of the LED light 115 of the impact driver 101, for example) (S712). After executing the command, the CPU 161 transmits the execution complete code to the voice control device 3 (S713). Furthermore, the CPU 161 turns off the green LED of the reporting portion 117, to indicate that the command from the voice control device 3 has been executed (S714), returns the processing to S705, and stands by to acquire the command ID and the limitation discrimination code.

On the other hand, the above-described change of mode involves a change in the rotation speed of the motor 12. For example, if the change in mode is executed while an inexperienced operator is using the impact driver 101 with the motor 12 being driven, the operator may not be able to appropriately respond to the change in the rotation speed of the motor 12, and this is not desirable. For that reason, in the present embodiment, if the limitation discrimination code is "1", the commanded operation is executed after the driving of the motor 12 is stopped.

Specifically, if the limitation discrimination code is "1" (yes at S711), the CPU 161 determines whether or not the switch 13 for activating the motor 12 is on (namely, whether or not the motor 12 is being driven) (S721.) If the switch 13 is on (yes at S721), the CPU 161 transmits, via the communication portion 18, the stand-by code to the voice control device 3 (S722). Subsequently, in response to the switch 13 being turned off (no at S721), the CPU 161 shifts the processing to S712 and executes the operation in accordance with the command. Subsequently, the processing at S713 to S715 described above is performed, and the voice control processing ends.

Note that if, as in the example illustrated in FIG. 1, the multiple devices 100 are connected to the voice control device 3, the above-described processing is performed in each of the devices 100, in accordance with the control information from the voice control device 3.

As described above, in the power tool system 1 according to the present embodiment, the voice control device 3 acquires the voice data of the voice, and controls the operation of the device 100 (the power tool) by wireless communication, in accordance with the command relating to the operation of the device 100 identified based on the voice data. Thus, as long as the voice control device 3 can acquire the voice data of the command and can communicate wirelessly with the device 100, the device 100 can be controlled by a voice command that is issued at a location further away from the device 100, compared to a known system in which a voice control device is provided in a power tool. Thus, for example, the voice control device 3 can be installed independently of the power tool at a location where the voice control device 3 is less likely to be affected by dust that is generated by the processing operation. Further, a person (a worksite supervisor, for example) who is different from the person (worker) performing the operation using the power tool can issue an appropriate command using voice. Furthermore, using the single voice control device 3, multiple power tools can be controlled based on the voice command. Further, it is possible to control not only power tools but also an electrical appliance/appliances using the voice command, and thus the power tool system 1 offers a high level of convenience.

Further, in the present embodiment, the voice control device 3 acquires the voice data by receiving the voice data that is generated from the voice input to the user device 5. In particular, since the neck speaker 50 is employed as the user device 5, the voice input is not easily affected by noise, and is thus suitable.

Further, the CPU 161 of the device 100 controls the operation of the device 100 in accordance with the command ID and the limitation discrimination code transmitted from the voice control device 3. Thus, when a new device 100 that can be wirelessly connected to the voice control device 3 is launched in the market, operation that corresponds to at least one of the command IDs can be set in the new device 100. As a result, the new device 100 can operate in accordance with the command ID transmitted from the voice control device 3. Thus, it is possible to increase the devices 100 that can be controlled by the voice control device 3 using the voice command, without changing the command identification information (refer to FIG. 10) stored in the voice control device 3.

Correspondences between each of the structural elements (features) of the above-described embodiment and each of structural elements (features) of the present disclosure or invention are as follows. Note that each of the structural elements of the embodiment is merely an example and is not intended to limit each of the structural elements of the present disclosure or invention.

The power tool system 1 is an example of a "power tool system". Each of the devices 100 is an example of a "controlled device". Each of the impact driver 101 and the grinder 102 is an example of a "power tool". The voice control device 3 is an example of a "voice control device". The CPU 331 is an example of a "first processor". The controller 33 is an example of a "system controller". The neck speaker 50 is an example of a "user device", a "wearable device", and a "neck speaker". The microphone 52 is an example of a "voice input portion". The CPU 561 is an example of a "second processor". The controller 56 is an example of a "device controller". The speaker 53 is an example of a "voice output portion". The wear detection portion 55 is an example of a "detection portion". The battery mounting portion 311 is an example of a "battery mounting portion". The battery 93 is an example of a "battery". The motor 12 is an example of a "motor". The CPU 161 is an example of a "third processor". The controller 16 is an example of a "tool controller".

Note that the power tool system according to the present disclosure is not limited to the example of the above-described embodiment. For example, at least one of non-limiting modifications described below can be employed in combination with any one or more of the power tool system 1, the voice control device 3, and the device 100 exemplified in the above-described embodiment, or the features described in each of the claims.

For example, the power tool system according to the present disclosure may include the voice control device 3, at least one of the devices 100, and a server (an information processing device) that is connectable to the voice control device 3 via a network (a mobile phone network, a wireless local area network (LAN), or the Internet, for example). In this modified embodiment, the voice control device 3 may be connected to the network in a wireless or wired manner, and communicate with the server via the network. Note that the power tool system according to this modified embodiment may optionally include the user device 5.

In this modified embodiment, the controller 33 (the CPU 331) of the voice control device 3 converts the voice input from the microphone 34 to the voice data, or receives the voice data from the user device 5 and transmits the acquired voice data to the server. In the server, a controller, which includes at least one processor and at least one memory, identifies a command by performing voice recognition using a voice recognition model, as described in the above-described embodiment, and transmits the identified command to the voice control device 3. Alternatively, the controller of the server may transmit, to the voice control device 3, text data obtained by the voice recognition, and the controller 33 of the voice control device 3 may perform only the identification of the command. Furthermore, if the voice control device 3 receives a command relating to operation of a device 100 whose information is not stored in the storage portion 35, the voice control device 3 may communicate with the server to acquire information relating to that device 100. Further, the voice control device 3 may communicate with the server as applicable, acquire a new voice recognition model that has been updated on the server, and perform the voice recognition and the identification of the command using the new voice recognition model.

In a similar manner to the power tool system of the above-described modified embodiment, the user device 5 may be omitted from the power tool system 1 of the above-described embodiment. In this modified embodiment, the controller 33 (the CPU 331) of the voice control device 3 may acquire the voice data generated by the microphone 34. Further, a different type of wearable device (a smart watch, for example) may be employed as the user device 5. Alternatively, a mobile terminal, such as a smart phone or a tablet, may be employed as the user device 5.

The user registration processing (the registration of the voice data) in the above-described embodiment may be performed by transmitting, to the voice control device 3, the voice data of the voice input from the microphone 52 of the neck speaker 50, after the pairing with the voice control device 3. If the voice input and the voice output are not necessary on the voice control device 3, the microphone 52 and the speakers 53 may be omitted. Further, this also applies to the manipulation portion 316 and the reporting portion 317.

The voice control device 3 may be of an adaptor type. In this modified embodiment, the voice control device 3 may include a retainer or fastener (a hook, for example) that can be attached to clothing or a belt of the user 7 or the operator of the power tool. Further, the voice control device 3 may include a USB terminal, so that the voice control device 3 receives a supply of power from a mobile battery, for example. Alternatively, the voice control device 3 may receive a supply of power from an external AC power source connected to the voice control device 3 via a power cord. If the voice control device 3 is connectable to the AC power source, the voice control device 3 may have a charging function for the battery 93. Alternatively, the voice control device 3 may be integrated with the electrical appliance/electronic equipment (for example, the illumination device 103, a radio, or the like) that are usable at the worksite.

In order to simplify the description, the he above-described embodiment describes the example in which, in response to the voice control device 3 receiving the single command for the single device 100, the voice control device 3 causes that single device 100 to execute that command. However, as in first to third modified embodiments to be described below, the voice control device 3 may be configured to process a plurality of commands relating to the plurality of devices 100 and/or process a command for which a time is specified.

In the first modified embodiment, the user 7 of the neck speaker 50 may input voice of commands with respect to the plurality of devices 100 at one time. In this case, the controller 33 (the CPU 331) of the voice control device 3 can control the devices 100 by identifying, at S474 and S475 of the command identification processing (refer to FIG. 9), the commands that correspond to the respective devices 100, based on the acquired voice data, and, at S502 of the command execution processing (refer to FIG. 11), transmitting the appropriate control information (the command IDs, the limitation discrimination codes) to the respective devices 100. Further, an individual confirmation request for the execution may be transmitted to the neck speaker 50 at S506 for each of the commands. Alternatively, only a single confirmation request for the execution of the plurality of commands may be transmitted. Corresponding to the requests or the single request, the user 7 of the neck speaker 50 may input voice confirming the execution for each of the commands, or may input voice confirming the execution of the plurality of commands as a batch in response to the request for the utterance issued at S675 of the voice command processing (refer to FIG. 16).

In a second modified embodiment, the user 7 of the neck speaker 50 may input voice of a command that relates to the operation of the device 100 and that specifies a scheduled execution time. In this case, after identifying the command at S474 and S475 of the command identification processing (refer to FIG. 9), the controller 33 (the CPU 331) of the voice control device 3 may perform processing that differs depending on whether or not the targeted device 100 supports a timer setting. Specifically, for example, if the targeted device 100 does not support the timer setting, the controller 33 may stand by until the specified time, using a timer of the voice control device 3, and may transmit the control information to the device 100 when the specified time is reached. On the other hand, if the targeted device 100 supports the timer setting, after identifying the command at S474 and S475, the controller 33 may transmit, without waiting until the specified time information of the specified time together with the control information to the device 100. The controller 16 (the CPU 161) of the device 100 may stand by until the specified time, and execute the command based on the control information when the specified time is reached. Note that, when the controller 16 receives the control information corresponding to another command before the specified time, the controller 16 may execute the other command.

A third modified embodiment can be realized by combining the first modified embodiment and the second modified embodiment. In other words, the voice control device 3 may acquire, from the neck speaker 50, the voice data corresponding to the plurality of commands that respectively specify scheduled execution time, and may control, in accordance with the identified commands, the plurality of devices 100 to execute the commands at the specified time.

DESCRIPTION OF THE REFERENCE NUMERALS

1: Power tool system; 100: Control target device (device); 101: Impact driver; 102: Grinder; 103: Illumination device; 11: Housing; 111: Battery mounting portion; 115: LED light; 116: Operation portion; 117: Notification portion; 118: Pairing button; 12: Motor; 121: Motor drive circuit; 13: Switch; 141: Light source; 16: Controller; 161: CPU; 162: ROM; 163: RAM; 164: Memory; 18: Communication portion; 3: Voice control device; 31: Housing; 311: Battery mounting portion; 313: Power switch; 314: Pairing button; 315: User registration button; 316: Operation portion; 317: Notification portion; 33: Controller; 331: CPU; 332: ROM; 333: RAM; 334: Memory; 34: Microphone; 35: Storage portion; 37: Speaker, 38: Communication portion; 5: User device; 50: Neck speaker; 501: Power switch; 502: Pairing button; 51: Main body; 516: Notification portion; 52: Microphone; 53: Speaker; 55: Wear detection portion; 56: Controller, 561: CPU; 562: ROM; 563: RAM; 564: Memory; 58: Communication portion; 7: User, 91: Tip tool; 93: Battery.

The invention claimed is:

1. A power tool system comprising:

at least one controlled device including a power tool; and a voice control device configured to wirelessly communicate with the at least one controlled device; and a user device configured to wirelessly communicate with the voice control device, wherein:

the voice control device includes at least one first processor configured to control operation of the at least one controlled device;

the at least one first processor is configured to (i) acquire voice data, and (ii) control operation of the power tool in accordance with a command relating to the operation of the power tool and identified based on the voice data;

the user device includes (i) a voice input portion including a microphone and configured to receive an input of voice via the microphone and convert the voice to the voice data and (ii) at least one second processor configured to control operation of the user device;

the at least one second processor is configured to transmit, to the voice control device, the voice data generated by the voice input portion; and the at least one first processor of the voice control device is configured to control the operation of the power tool based on the voice data received from the user device.

2. The power tool system according to claim 1, wherein:

the user device further includes a voice output portion configured to output voice; and the at least one first processor is configured to control the output of the voice output portion.

3. The power tool system according to claim 1, wherein the user device is a wearable device.

4. The power tool system according to claim 3, wherein the wearable device is a neck speaker wearable around the neck of a person.

5. The power tool system according to claim 3, wherein the wearable device further includes a detection portion configured to detect whether the wearable device is being worn, the at least one second processor is configured to transmit, to the voice control device, information indicating whether the wearable device is being worn, in accordance with a detection result by the detection portion, and the at least one first processor is configured to perform different processing depending on when the at least one first processor receives information indicating that the wearable device is not being worn and when the at least one first processor receives information indicating that the wearable device is being worn.

6. The power tool system according to claim 1, wherein:

the voice control device includes a battery mounting portion;

the voice control device is configured to operate using power supplied from a rechargeable battery detachably mounted to the battery mounting portion; and the battery is selectively mountable to multiple types of power tools.

7. The power tool system according to claim 1, wherein the at least one first processor is configured to perform at least one of voice recognition of the voice data and identification of the command, using a machine-learned model.

8. The power tool system according to claim 1, wherein:

the at least one first processor is configured to (i) perform voiceprint authentication using the voice data and comparison data of at least one registered user, and (ii) determine whether voice represented by the voice data is voice of the at least one registered user; and the at least one first processor is configured to cause the power tool to operate in accordance with the command only if the at least one first processor determines that the voice represented by the voice data is the voice of the at least one registered user.

9. The power tool system according to claim 5, wherein:

the at least one controlled device includes the wearable device;

the wearable device further includes a voice output portion configured to output voice;

the at least one first processor is configured to (i) perform voiceprint authentication using the voice data and comparison data of at least one registered user, and (ii) determine whether voice represented by the voice data is voice of the at least one registered user; and the at least one first processor is configured to cause the power tool to operate in accordance with the command only if the at least one first processor determines that the voice represented by the voice data is the voice of the at least one registered user; and the at least one first processor is configured to output voice from the voice output portion requesting an utterance for performing the voiceprint authentication once more, in response to receiving the information, from the wearable device, indicating that the wearable device is not being worn.

10. The power tool system according to claim 1, wherein the at least one first processor is configured to confirm, with a user, whether execution of the command is allowed, before causing the power tool to perform the operation in accordance with the command.

11. The power tool system according to claim 2, wherein the at least one first processor is configured to cause the voice output portion of the user device to output voice requesting a user to confirm execution of the command, before causing the power tool to perform the operation in accordance with the command.

12. The power tool system according to claim 1, wherein the at least one first processor is configured to (i) determine whether the command identified based on the voice data is executable without limitation in the power tool, and (ii) perform different processing depending on when the command is determined not to be executable without limitation and when the command is determined to be executable without limitation.

13. The power tool system according to claim 12, wherein:

the power tool includes (i) a motor and (ii) at least one third controller; and when the at least one third controller receives control information for executing the command from the voice control device during driving of the motor, the tool controller causes the power tool to operate in accordance with the control information after the driving of the motor is stopped.

14. The power tool system according to claim 13, wherein:

the at least one first controller is configured to transmit, to the power tool, different control information depending on whether or not the command is executable without limitation; and the at least one third processor is configured to (i) cause the power tool to operate in accordance with the control information after the driving of the motor is stopped, in response to receiving control information indicating that there is a limitation on execution of the command from the voice control device during the driving of the motor, and (ii) cause the power tool to operate in accordance with the control information regardless of the driving of the motor, in response to receiving the control information indicating that there is no limitation on execution of the command from the voice control device during the driving of the motor.

15. The power tool system according to claim 1, wherein:

the user device is a neck speaker configured to wirelessly communicate with the voice control device and wearable around the neck of a person;

the neck speaker includes a detection portion configured to detect whether the neck speaker is being worn;

the at least one second processor is configured to (i) transmit, to the voice control device, the voice data generated by the voice input portion and (ii) transmit, to the voice control device, information indicating whether the neck speaker is being worn, in accordance with a detection result by the detection portion;

the at least one first processor is configured to perform at least one of voice recognition of the voice data and identification of the command, using a machine-learned model; and the at least one first processor is configured to control the operation of the power tool in accordance with the command identified based on the voice data acquired from the neck speaker and the information indicating whether the neck speaker is being worn.

16. The power tool system according to claim 15, wherein:

the at least one controlled device includes the neck speaker;

the neck speaker further includes a voice output portion configured to output voice;

the at least one first processor is configured to (i) perform voiceprint authentication using the voice data and comparison data of at least one registered user, and (ii) determine whether voice represented by the voice data is voice of the at least one registered user; and the at least one first processor is configured to (i) cause the voice output portion of the neck speaker to output voice requesting a user to confirm execution of the command, in response to determining that the voice represented by the voice data is the voice of the at least one registered user, (ii) cause the power tool to operate in accordance with the command, in response to determining, based on the voice data acquired from the neck speaker, that the user confirmed the execution of the command and in response to receiving, from the neck speaker, the information indicating that the neck speaker is being worn, and (iii) cause the voice output portion of the neck speaker to output voice requesting an utterance for performing the voiceprint authentication once more, in response to receiving, from the neck speaker, the information indicating that the neck speaker is not being worn.

17. The power tool system according to claim 16, wherein:

the power tool includes (i) a motor and (ii) at least one third controller configured to control operation of the power tool in accordance with control information received from the voice control device for executing the command;

the at least one first controller is configured to transmit, to the power tool, different control information depending on whether or not the command is executable without limitation; and the at least one third processor is configured to (i) cause the power tool to operate in accordance with the control information after the driving of the motor is stopped, in response to receiving control information indicating that there is a limitation on execution of the command from the voice control device during the driving of the motor, and (ii) cause the power tool to operate in accordance with the control information regardless of the driving of the motor, in response to receiving the control information indicating that there is no limitation on execution of the command from the voice control device during the driving of the motor.

18. A power tool system comprising:

at least one controlled device including a power tool; and a voice control device configured to wirelessly communicate with the at least one controlled device, wherein:

the voice control device includes at least one first processor configured to control operation of the at least one controlled device;

the at least one first processor is configured to (i) acquire voice data, and (ii) control operation of the power tool in accordance with a command relating to the operation of the power tool and identified based on the voice data;

the at least one first processor is configured to (i) perform voiceprint authentication using the voice data and comparison data of at least one registered user, and (ii) determine whether voice represented by the voice data is voice of the at least one registered user; and the at least one first processor is configured to cause the power tool to operate in accordance with the command only if the at least one first processor determines that the voice represented by the voice data is the voice of the at least one registered user.

19. A power tool system comprising:

at least one controlled device including a power tool; and a voice control device configured to wirelessly communicate with the at least one controlled device, wherein:

the voice control device includes at least one first processor configured to control operation of the at least one controlled device;

the at least one first processor is configured to (i) acquire voice data, and (ii) control operation of the power tool in accordance with a command relating to the operation of the power tool and identified based on the voice data;

the at least one first processor is configured to (i) determine whether the command identified based on the voice data is executable without limitation in the power tool, and (ii) perform different processing depending on when the command is determined not to be executable without limitation and when the command is determined to be executable without limitation;

the power tool includes (i) a motor and (ii) at least one third controller;

when the at least one third controller receives control information for executing the command from the voice control device during driving of the motor, the tool controller causes the power tool to operate in accordance with the control information after the driving of the motor is stopped;

the at least one first controller is configured to transmit, to the power tool, different control information depending on whether or not the command is executable without limitation; and the at least one third processor is configured to (i) cause the power tool to operate in accordance with the control information after the driving of the motor is stopped, in response to receiving control information indicating that there is a limitation on execution of the command from the voice control device during the driving of the motor, and (ii) cause the power tool to operate in accordance with the control information regardless of the driving of the motor, in response to receiving the control information indicating that there is no limitation on execution of the command from the voice control device during the driving of the motor.

* * * * *